US011577677B2

(12) United States Patent
Rojas et al.

(10) Patent No.: US 11,577,677 B2
(45) Date of Patent: Feb. 14, 2023

(54) VEHICLE SYSTEM THAT INCLUDES EXTERNAL AIRBAG IMPELLERS WITH ITS MOUNTING STRUCTURE THAT, IN ADDITION TO PREVENTING DAMAGE TO THE OUTSIDE AND THE BOTTOM OF THE VEHICLE, ALSO ALLOWS ITS BUOYANCY

(71) Applicants: Diogenes Patrick Rojas, Chicago, IL (US); Ivan Emilio Bournigal Guzman, Santiago de los Caballeros (DO)

(72) Inventors: Diogenes Patrick Rojas, Chicago, IL (US); Ivan Emilio Bournigal Guzman, Santiago de los Caballeros (DO)

( * ) Notice: Subject to any disclaimer, the term of this patent is extended or adjusted under 35 U.S.C. 154(b) by 52 days.

(21) Appl. No.: 16/575,413

(22) Filed: Sep. 19, 2019

(65) Prior Publication Data
US 2021/0086713 A1    Mar. 25, 2021

(51) Int. Cl.
| | |
|---|---|
| *B60R 21/01* | (2006.01) |
| *B60R 21/215* | (2011.01) |
| *B60R 21/264* | (2006.01) |
| *B60R 21/36* | (2011.01) |
| *B60R 21/013* | (2006.01) |
| *B60R 21/00* | (2006.01) |

(52) U.S. Cl.
CPC ........... *B60R 21/01* (2013.01); *B60R 21/215* (2013.01); *B60R 21/264* (2013.01); *B60R 21/36* (2013.01); *B60R 2021/0016* (2013.01); *B60R 2021/01211* (2013.01); *B60R 2021/01306* (2013.01)

(58) Field of Classification Search
CPC ..................................................... B60R 21/36
See application file for complete search history.

(56) References Cited

U.S. PATENT DOCUMENTS

| | | | |
|---|---|---|---|
| 4,276,454 A | 6/1981 | Zathan | |
| 4,349,809 A | 9/1982 | Tomes | |
| 4,518,183 A * | 5/1985 | Lee .......................... | B60R 19/40 |
| | | | 293/118 |
| 6,106,038 A * | 8/2000 | Dreher ..................... | B60T 7/22 |
| | | | 293/118 |

(Continued)

FOREIGN PATENT DOCUMENTS

| | | | | |
|---|---|---|---|---|
| CN | 106114431 A | * | 11/2016 | ............. B60R 21/00 |
| CN | 106394454 A | * | 2/2017 | |

(Continued)

*Primary Examiner* — Nicole T Verley
(74) *Attorney, Agent, or Firm* — Chen-Chi Lin

(57) ABSTRACT

The present invention relates to a system that is mounted on a mounting structure or chassis intended to protect the vehicles and their occupants. The system uses a main computer, high-precision radars, external airbag impellers, airbags that protect the vehicle and to some extent help its buoyancy, fluid sensors to detect the water limit that the vehicle can reach, and if these sensors are activated send a signal to the main computer that is responsible for activating air bag impellers, an inclinometer to detect the limit of inclination established in the vehicle and if the inclinometer detects an inclination that exceeds the limit established, this sends a signal to the main computer that is responsible for activating all the air bag impeller devices; and a monitor with signal transmitters to visualize in the state in which the system is located.

18 Claims, 23 Drawing Sheets

(56) References Cited

U.S. PATENT DOCUMENTS

| | | | |
|---|---|---|---|
| 6,416,093 B1* | 7/2002 | Schneider | B60R 19/205 |
| | | | 293/118 |
| 7,232,001 B2 | 6/2007 | Hakki et al. | |
| 7,532,152 B1 | 5/2009 | Yonak | |
| 10,471,927 B1* | 11/2019 | Gupta | B60R 21/36 |
| 2004/0049331 A1* | 3/2004 | Schneider | B60R 19/205 |
| | | | 701/45 |
| 2019/0299893 A1* | 10/2019 | Kanegae | B60R 21/0134 |
| 2020/0172041 A1* | 6/2020 | Dix | B60R 21/235 |
| 2021/0070245 A1* | 3/2021 | Amacker | B60R 19/205 |
| 2021/0229623 A1* | 7/2021 | Kwon | B60R 21/2338 |

FOREIGN PATENT DOCUMENTS

| | | | | |
|---|---|---|---|---|
| CN | 106740629 A | * | 5/2017 | |
| CN | 106945623 A | * | 7/2017 | |
| CN | 107839642 A | * | 3/2018 | |
| CN | 207106436 U | * | 3/2018 | B60R 21/00 |
| CN | 108688595 A | * | 10/2018 | B60R 21/00 |
| CN | 208006901 U | * | 10/2018 | |
| CN | 108819894 A | * | 11/2018 | B60R 19/02 |
| CN | 108839630 A | * | 11/2018 | |
| CN | 108340969 B | * | 10/2020 | B60R 21/01 |
| CN | 113997899 A | * | 2/2022 | |
| CN | 115210113 A | * | 10/2022 | |
| DE | 202019002962 U1 | * | 9/2019 | |
| DE | 102020107134 A1 | * | 9/2021 | |
| KR | 200454318 Y1 | * | 6/2011 | |
| WO | WO-9744216 A1 | * | 11/1997 | B60R 19/205 |
| WO | WO-2007138126 A1 | * | 12/2007 | B60Q 1/52 |
| WO | WO-2013036162 A1 | * | 3/2013 | B60R 21/36 |

* cited by examiner

VEHICLE SYSTEM THAT INCLUDES EXTERNAL AIRBAG IMPELLERS WITH ITS MOUNTING STRUCTURE THAT, IN ADDITION TO PREVENTING DAMAGE TO THE OUTSIDE AND THE BOTTOM OF THE VEHICLE, ALSO ALLOWS ITS BUOYANCY

FIELD OF THE INVENTION

The present invention is encompassed within the field of external airbag systems for vehicles.

SUMMARY OF THE INVENTION

The present invention relates to a system that is mounted on a mounting structure or chassis intended to protect the vehicles and their occupants. The system uses a main computer, high-precision radars, external airbag impellers, airbags that protect the vehicle and to some extent help its buoyancy, fluid sensors to detect the water limit that the vehicle can reach, and if these sensors are activated send a signal to the main computer that is responsible for activating air bag impellers, an inclinometer to detect the limit of inclination established in the vehicle and if the inclinometer detects an inclination that exceeds the limit established, this sends a signal to the main computer that is responsible for activating all the air bag impeller devices; and a monitor with signal transmitters to visualize in the state in which the system is located.

BACKGROUND

Systems and devices for outdoor airbags in vehicles have gone through a series of changes since its invention, achieving with these changes, more reliability and safety, focusing in general on the protection of the occupants of the vehicle or the protection of the pedestrians and not in the protection of the body, although there are systems and devices for outdoor air bags that can protect it from small impacts. As is known, the body in conjunction with the chassis, works as the most important means of protection, since these are the ones that will receive most of the blows; For this reason, the design of the body and the chassis have been perfected to make them more efficient, dissipating the impact energy. This has led to the creation of more flexible bodies, and having the capacity to absorb more energy, this is more destroyed, but much less damage is produced inside the vehicle. However, despite the advances, the body or chassis is still the most important means of protection and do not fully meet the objective of protecting the occupants, especially at high speeds, also when the vehicle is overturned or trapped by water, in these cases the security systems do not manage to do their work with greater efficiency or literally do not work and the vehicle or the people inside it are totally exposed to all kinds of damages.

One of the limitations observed when two vehicles collide, is that the body suffers damage that could be irreparable, but also these damages can become a threat to the occupants. Here are several examples to get a better understanding of the problem.

1—A person who cannot be removed from a vehicle that catches fire because the doors are blocked by the impact and the chassis is putting pressure on the body.

2—A vehicle that moves at a considerable speed, could be as an example, 62 mph and this impacts another vehicle.

3—A vehicle that loses control and it flips over.

4—A vehicle that loses control and falls into a ravine.

5—A vehicle that is trapped in the rising of a river or falls on a considerable surface of water.

In these cases, the vehicle and its occupants are seriously exposed to any type of damage.

DESCRIPTION OF THE INVENTION

The system that is recommended is associated with a number of air bag drivers, airbags, radars, a main computer of the main system computer system, an inclinometer, fluid level sensors, a monitor with signal transmitters, that it will indicate us in the state in which the system is located, and an energy supply, all mounted on a mounting structure or chassis, operating together and independently of any other system the vehicle possesses. The purpose of the system is to protect the occupants of the vehicle and the vehicle.

The function of the air bag impellers is to push an airbag to the outside, which is inflated by means of detonating charges, and due to the explosion, it releases a large volume of gas that will fill the air pockets. Also the devices, when expelling the airbags of the vehicle by means of pistons, create a space between the body and the air bags, this avoids that when inflating the airbag does not produce a friction with the body.

The airbag impellers we call "Piston Type" are inside a protective base and the outside is covered with a protective cap that is broken on the inside, fastened with plugs all over the edge. The outside of said protective base, completely covering the airbag impellers' "Piston type". When the "Piston Type" air bag impellers are pushed outwards, it exerts a pressure on the broken protective cover, fragmenting it and getting out without problems to the outside. The "Piston Type" airbag impellers are activated in a multi-stage process that works as follows: The radars send an electrical signal to the main system computer that in turn processes the information to then issue an order or electrical signal to the detonating chargers that are located in the back of the main base in the form of a cylinder, releasing the gas that impelled the piston forward which has a mechanism of action connected with the front detonating chargers, and in the front of the main base has a limiting base or collar with action mechanism that has active current; When the mechanism of action of the pistons collides with the mechanism of action of the base or limiting collar, it sends an electrical signal to the front detonating chargers, causing the gas inside to be released into the air pockets, filling it. In this way the parts of the vehicle are protected according to the area covered by the airbag driving devices, preventing any vehicle or object from directly hitting the bodywork.

In case the vehicle in which we are losing balance, the system has an inclinometer that detects the tilt limit and if the vehicle exceeds this limit, the inclinometer sends an order or electrical signal to the main system computer to activate all the devices of air bag in this way all parts of the vehicle are protected. If the vehicle is trapped in a flood of a river or falls on a large surface of water, the system has several fluid sensors; if the sensors detect a water pressure that goes beyond the limit established by said sensors, they send an electrical signal to the main system computer to activate the air pockets of the lower part of the vehicle or in certain cases activate all the air pockets. The function of the airbags is to cushion and absorb part of the energy that is produced in the impact or in certain cases it helps to delay or prevent the collapse of the vehicle.

More specifically, the system that is advocated responds in the following way:

(a) If the radars detect an approaching object at high speed, in case it is a possible impact, the radars send an electrical signal to the main system computer, which is responsible for processing the information to issue an activation order to the device Airbag driver that is closest to the approaching object.

(b) If our vehicle is heading towards an object, which could be a vehicle, a tree, a light pole, a wall and the radars detect it as a possible impact, the radars send an electrical signal to the main system computer, which will be responsible for activating the drive device that is closest to the object.

(c) If our vehicle is caught in a river rising or falls on a considerable surface of water, and the water exceeds the limit of the level that has been established in the fluid sensors; The fluid sensors send an electrical signal to the main system computer that will activate the airbag impellers that are located in the lower part of the vehicle or in certain cases activate all the air pockets.

(d) If the vehicle loses its balance and the inclinometer detects that it has exceeded the tilt limit, it sends a signal to the main system computer to activate all the air bag drive devices.

The system for the development of its functions basically comprises the following:

A main assembly structure.
A main computer of the system or main system computer (I1).
A plurality radar.
An inclinometer.
A plurality water level sensor.
A plurality air bag impeller.
A plurality air bags.
A monitor with signal emitters.
An energy supply The invention whose protection is requested responds with greater efficiency in front of the existing outdoor airbag systems, managing to reduce the damage that can be received by the vehicle and its occupants, since air bag ejector devices in conjunction with air bags they would absorb as much energy as possible from the impact and not the bodywork or the chassis, they would also help to avoid or diminish the blows if the vehicle turns, or to delay the collapse of the vehicle if it falls on the water or is trapped in she. The truth is that I do not know an invention that allows to protect the occupants and the vehicle like the one presented below.

The advantages and benefits of this system are obvious, you could avoid damages such as victims with serious injuries or fatal victims, also reduce the financial cost that could represent for people who are involved in an accident or family members and governmental bodies that each year they invest a significant amount of resources due to traffic accidents.

DESCRIPTION OF THE DRAWINGS

Next, for clarity and understanding of the invention, a series of non-limiting figures is briefly described, all done in simple titles of examples, with their parts identified with letters and numbers in this way.

DETAILED DESCRIPTION OF THE INVENTION

Figure 1:
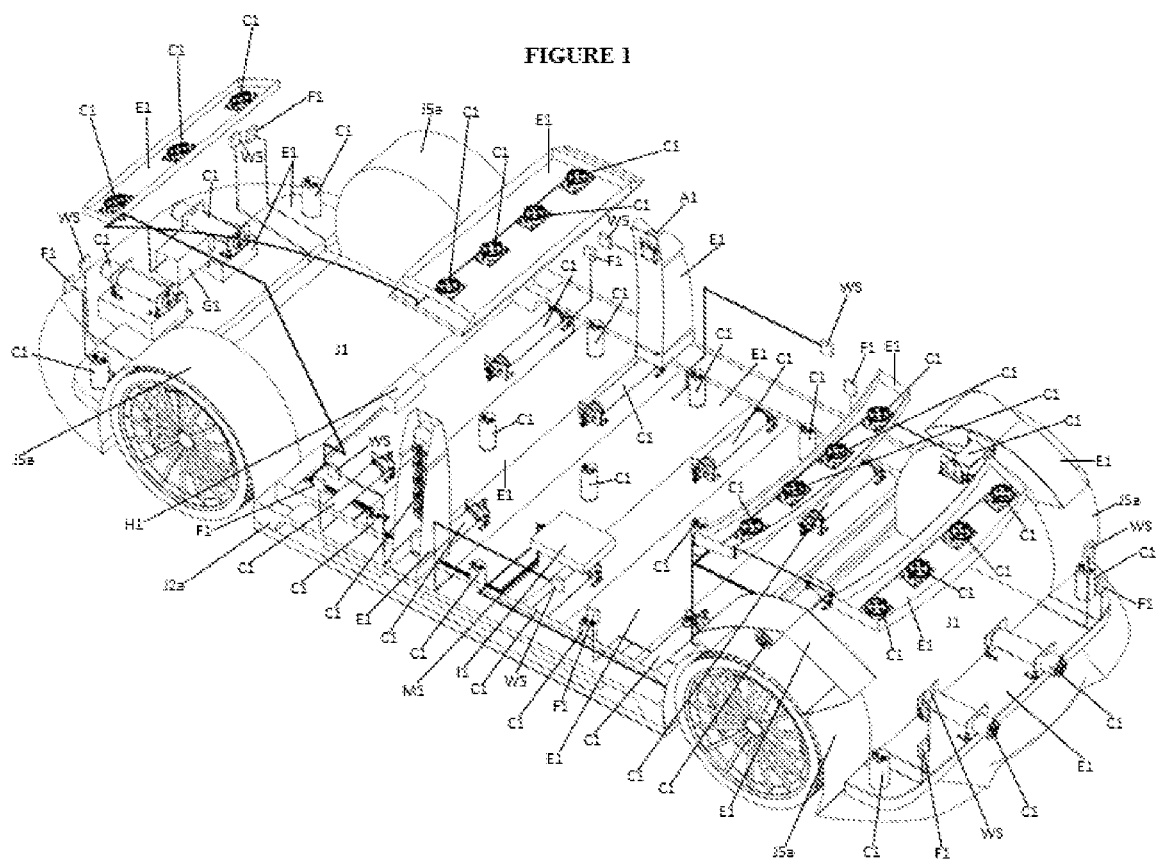
FIG. 1: It is a top perspective view and right side of the system with its unidentified parts, placed in the main mounting structure (MS1).
Figure 2:
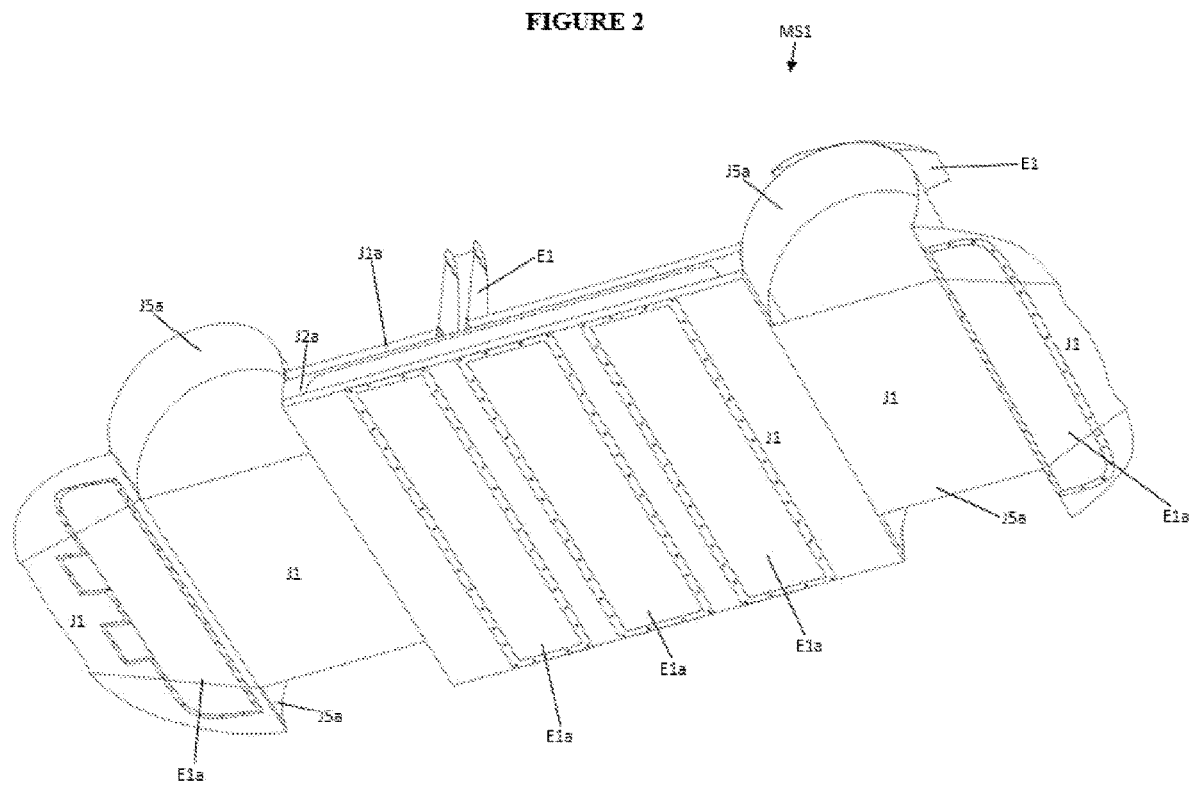
FIG. 2: Is a bottom perspective view of the right side of the main mounting structure (MS1) with its parts identified.
Figure 3:
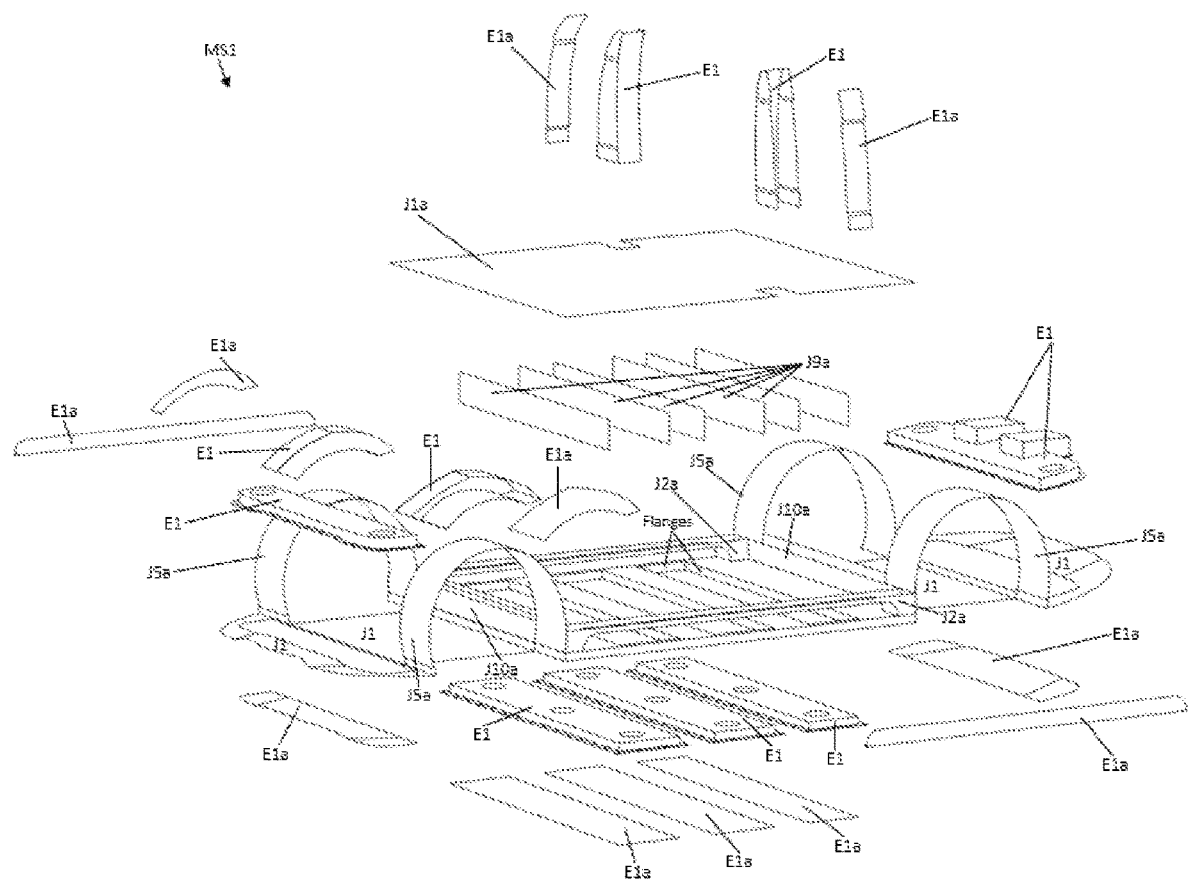
FIG. 3: It is a top perspective view of the main assembly structure (MS1) disassembled with its identified parts.
Figure 4:
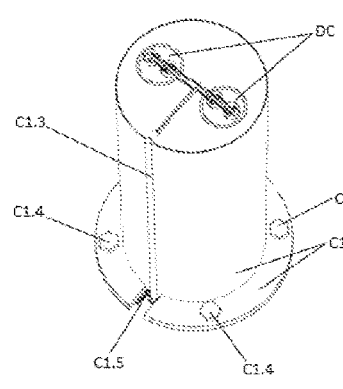
FIG. 4: Is a top perspective view of the air bag driver "piston type" (C1), with their identified parts.
Figure 5:
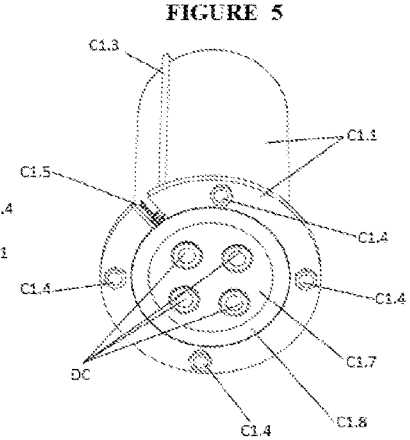
FIG. 5: It is a bottom perspective view of the "piston type" air bag driver (C1).
Figure 6:
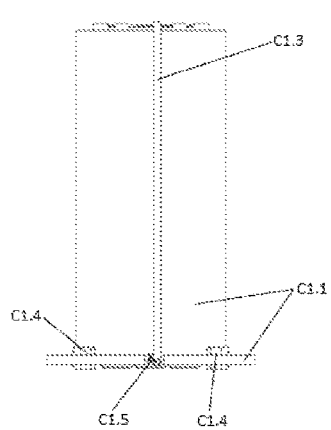
FIG. 6: It is a view of the back of the air bag driver "piston type" (C1).
Figure 7:
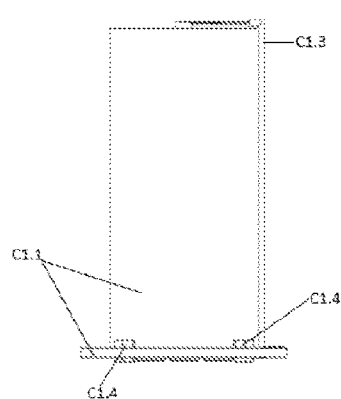
FIG. 7: It is a view of the left side of the air bag driver "piston type" (C1).
Figure 8:
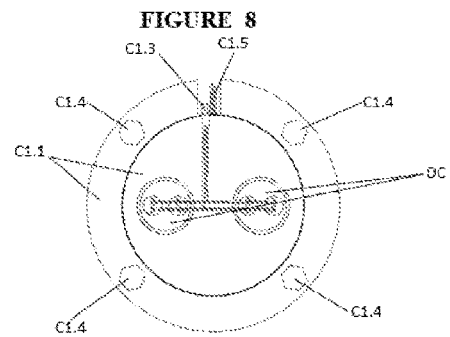
FIG. 8: It is a view of the upper part of the air bag driver "piston type" (C1).
Figure 9:
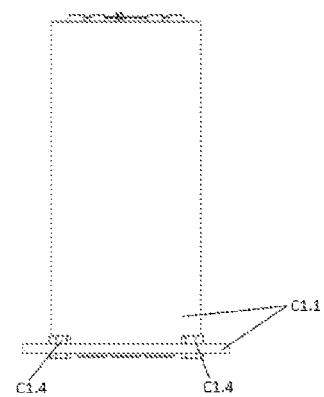
FIG. 9: It is a view of the front part of the air bag driver "piston type" (C1), with their parts identified.
Figure 10:
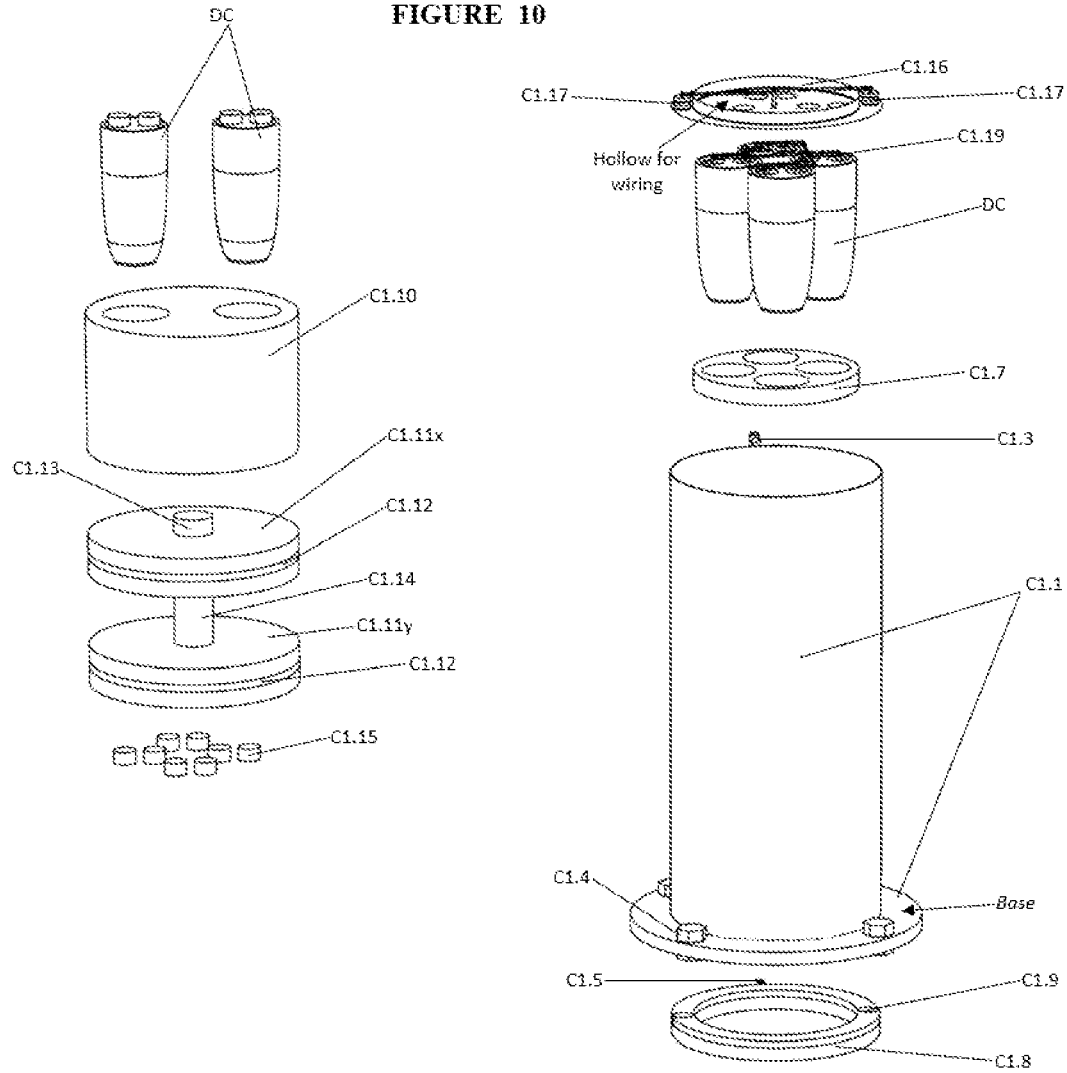
FIG. 10: Is a top perspective view of the front part of the air bag driver "piston type" (C1) disarmed with their identified parts.
Figure 11:
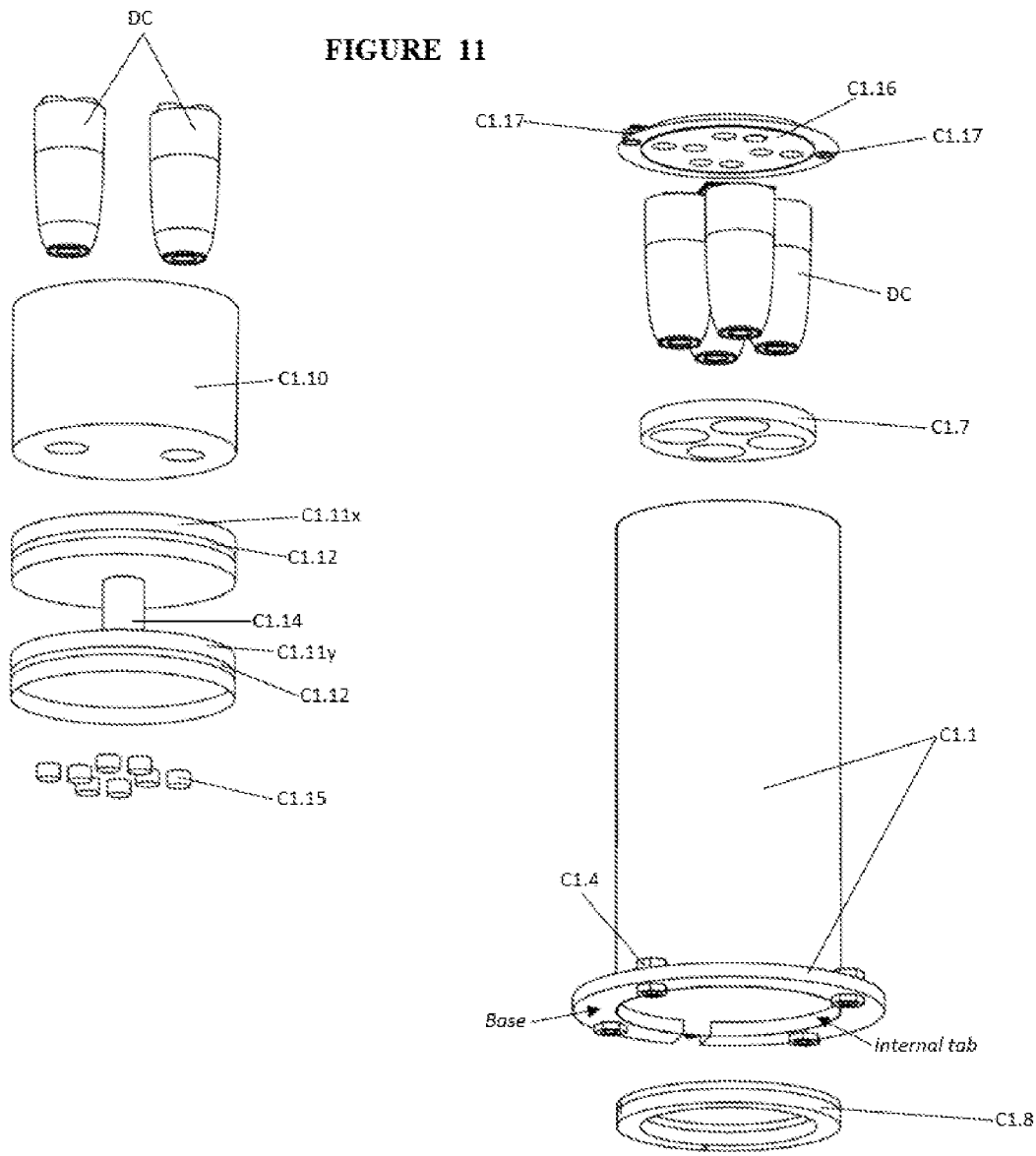
FIG. 11: Is a lower perspective view of the front part of the air bag driver "piston type" (C1), disarmed with their identified parts.
Figure 12:
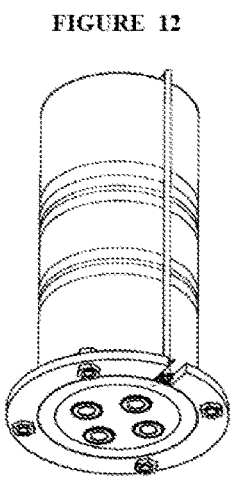
FIG. 12: It is an illustration of the air bag driver "piston type" (C1), in its inactive state.
Figure 13:
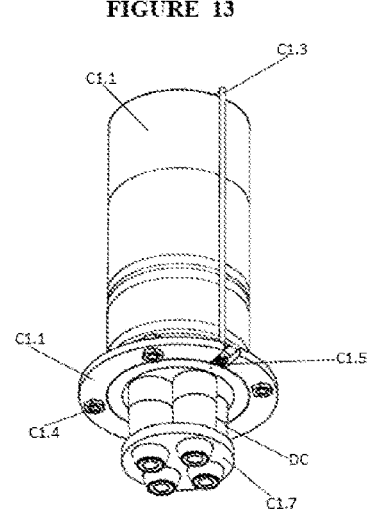
FIG. 13: It is an illustration of the "piston type" airbag drive device (C1), in its active state with its identified parts.
Figure 14:
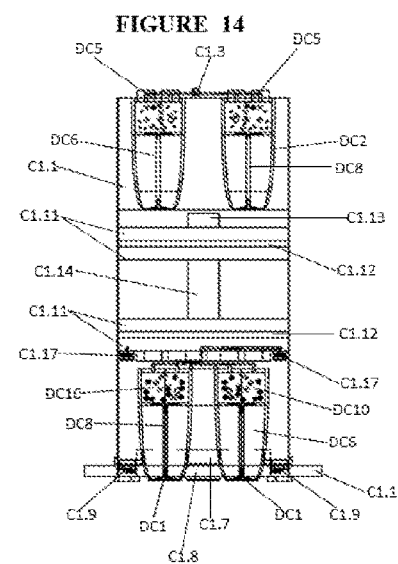
FIG. 14: Longitudinal section of the air bag driver "'piston type" (C1), with their identified parts.
Figure 15:
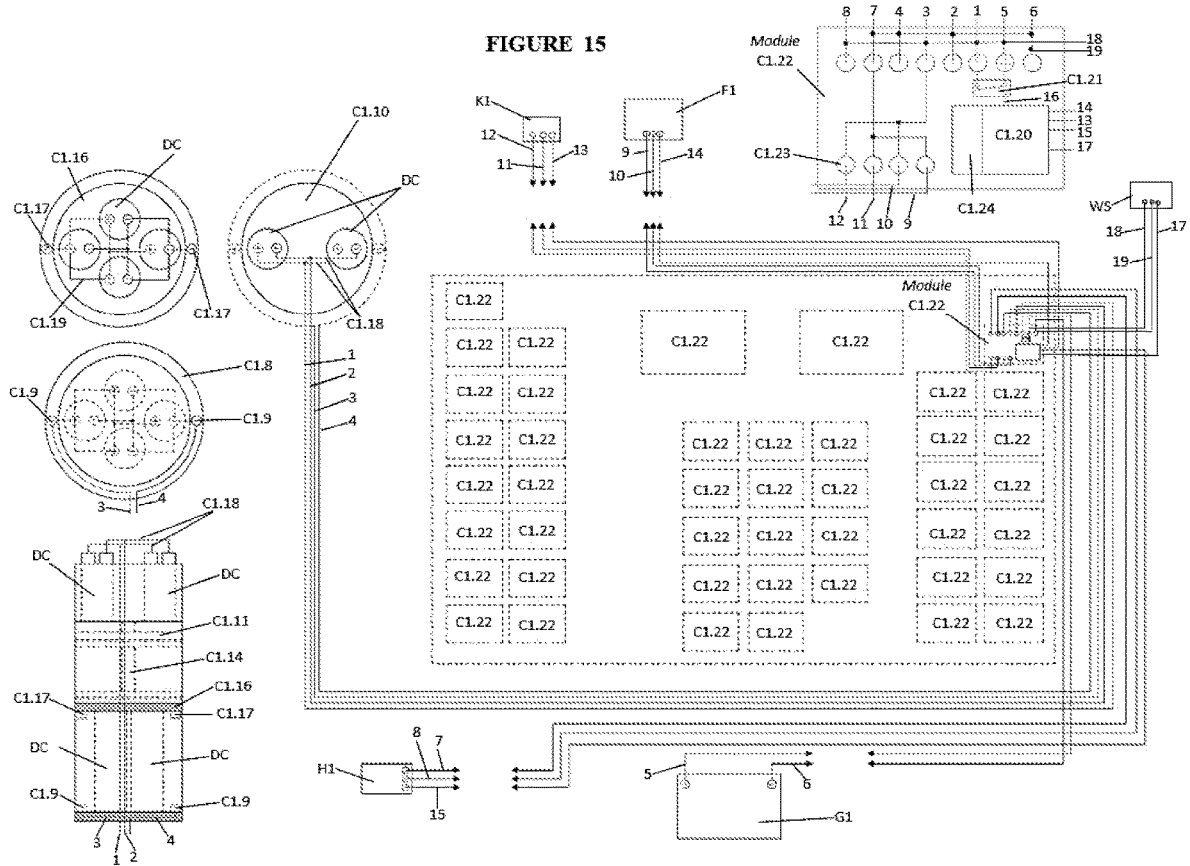
FIG. 15: Electrical diagram of the air bag driver "'piston type" (C1).
Figure 16:
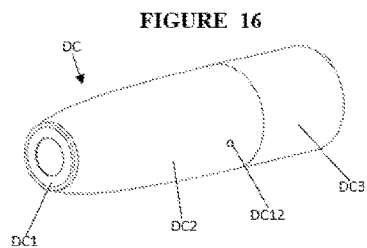
FIG. 16: It is a perspective view the detonating charger (DC) with its identified parts.
Figure 17:
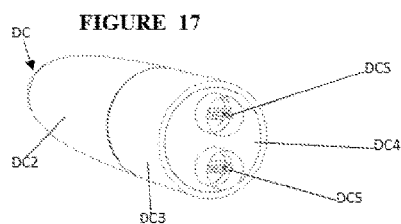
FIG. 17: It is a perspective view of the back and left side of the detonating charger (DC) with its identified parts.
Figure 18:
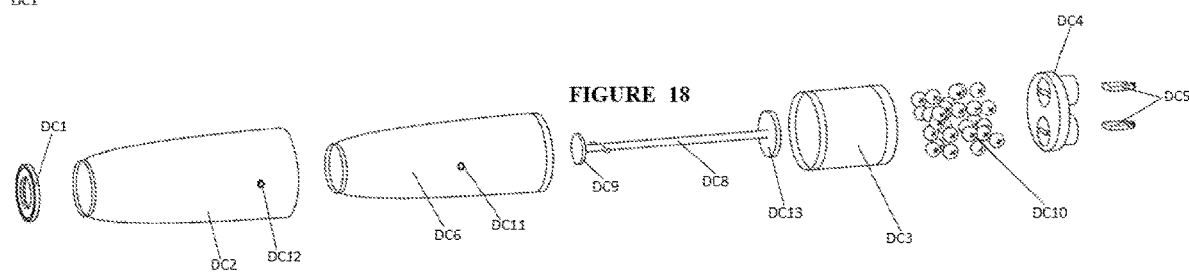
FIG. 18: It is a top perspective view of the front and left side of the detonating charger (DC) disassembled with its unidentified parts.
Figure 19:
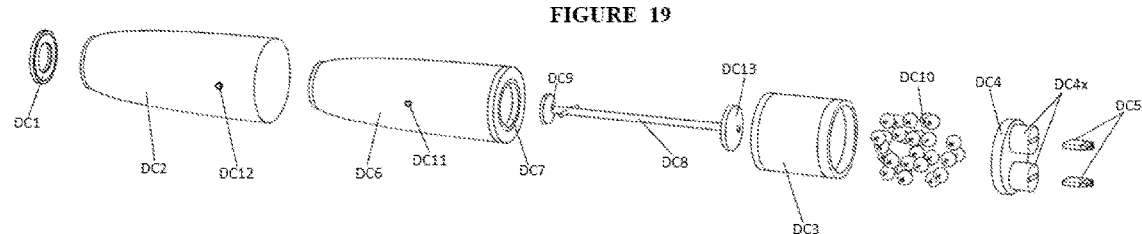
FIG. 19: It is a top perspective view of the back and left side of the detonating charger (DC) disarmed with its unidentified parts.
Figure 20:
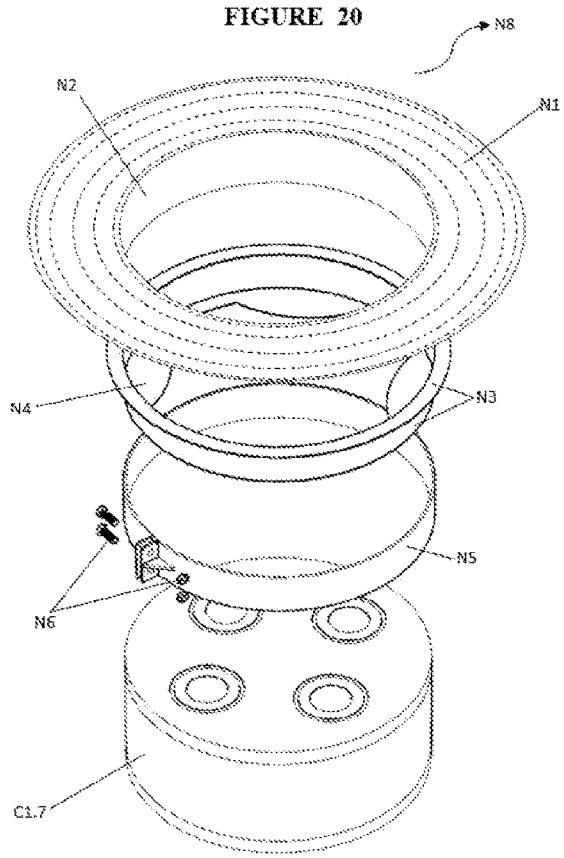
FIG. 20: Is a top perspective view of the joint part (N3) disassembled.
Figure 21:
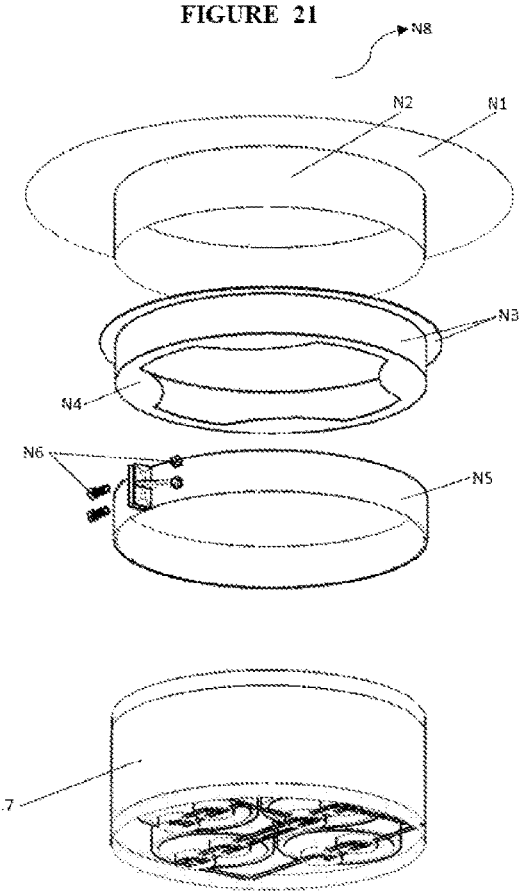
FIG. 21: Is a lower perspective view of the joint part (N3) disassembled.
Figure 22:
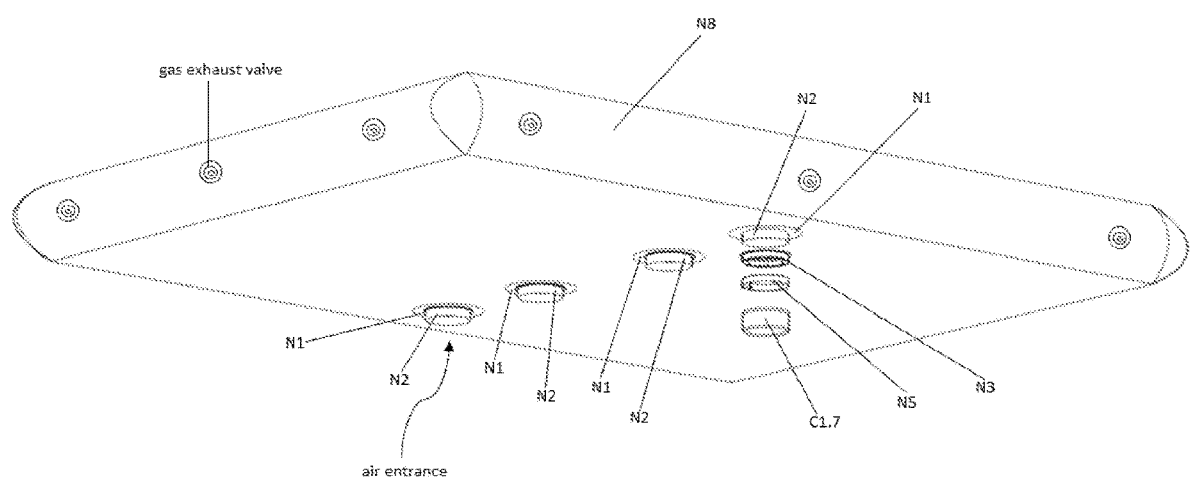
FIG. 22: It is a bottom perspective view of the air bag with the coupling piece (N3) disassembled and its parts identified.
Figure 23:
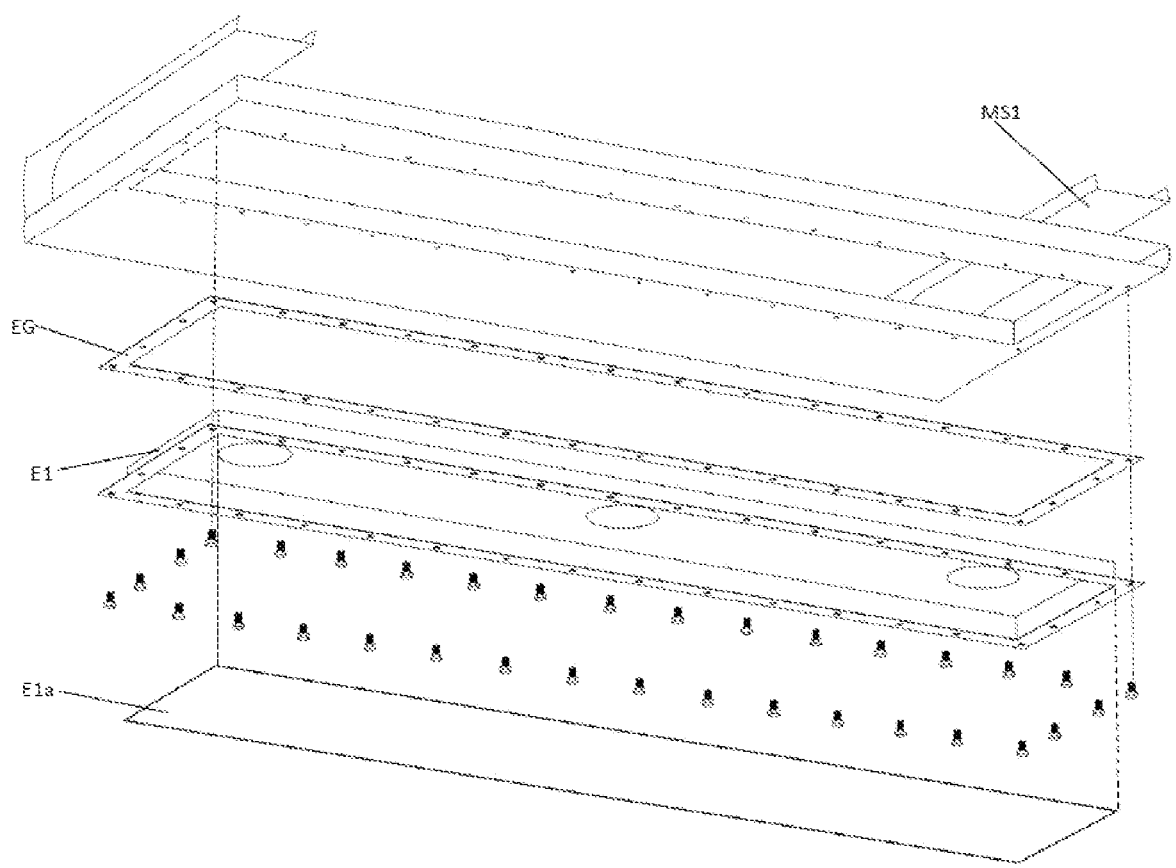
FIG. 23: It is a bottom perspective view of the protective base (E1), the cover of the protective base (E1a) and the rubber gasket (EG) disassembled.
Figure 24:
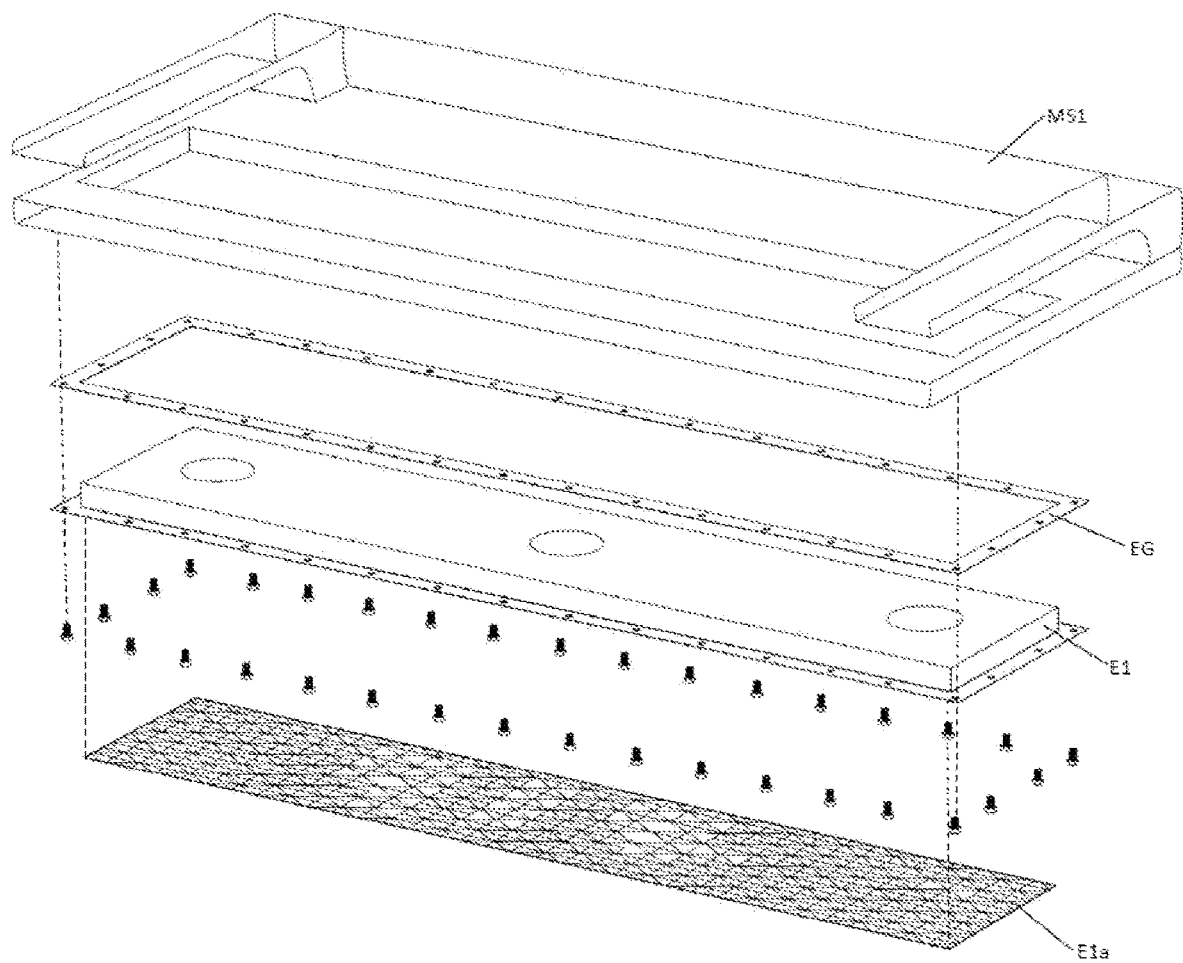
FIG. 24: It is a top perspective view of the protective base (E1), the cover of the protective base (E1a) and the rubber gasket (EG) disassembled.
Figure 25:
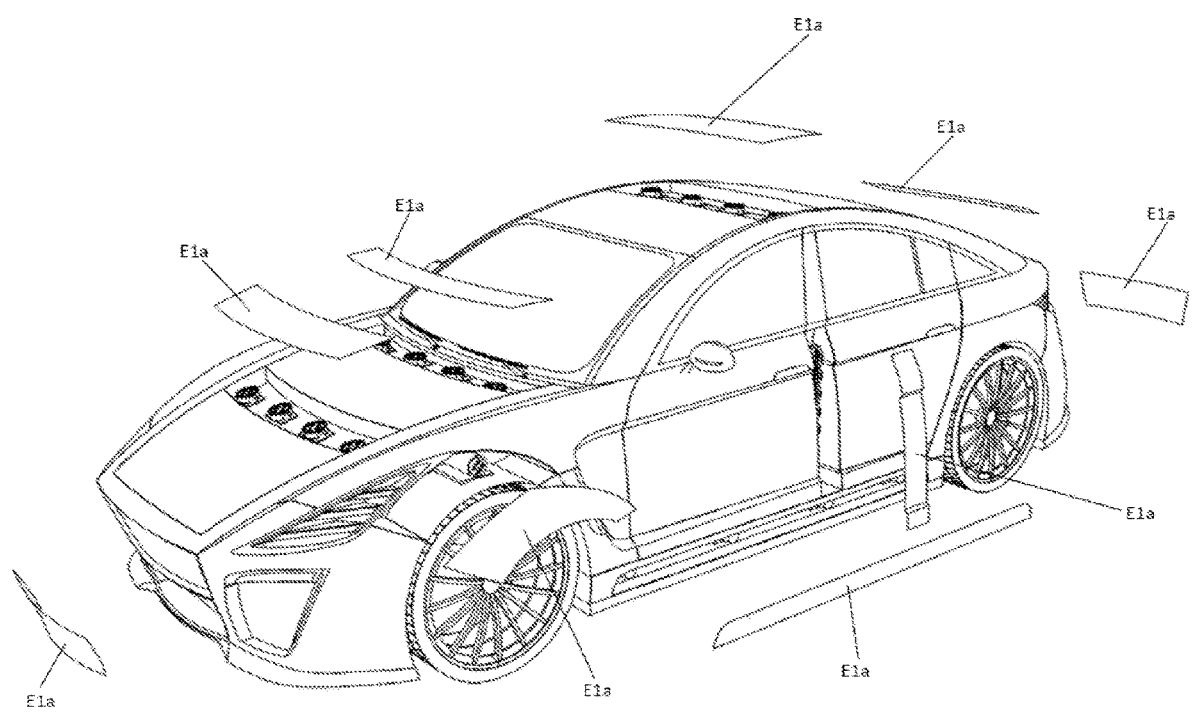
FIG. 25: It is a top perspective view of the left side of the vehicle with the covers for the protective base (E1a), disassembled and unidentified.
Figure 26:
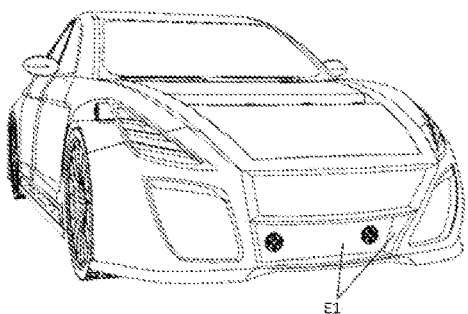
FIG. 26: It is a front view of the vehicle. The protective base (E1) is identified.
Figure 27:
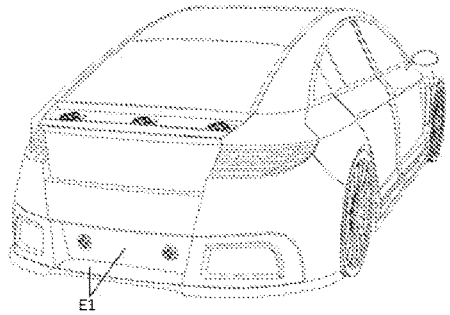
FIG. 27: It is a rear view of the vehicle. The protective base (E1) is identified.
Figure 28:
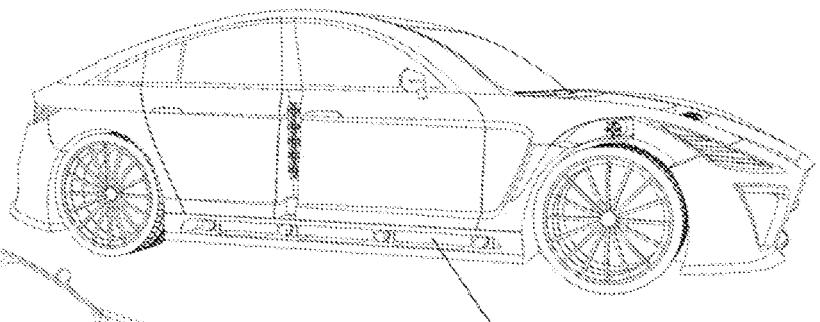
FIG. 28: It is a perspective view of the right side of the vehicle with the protector (E1) identified.
Figure 29:
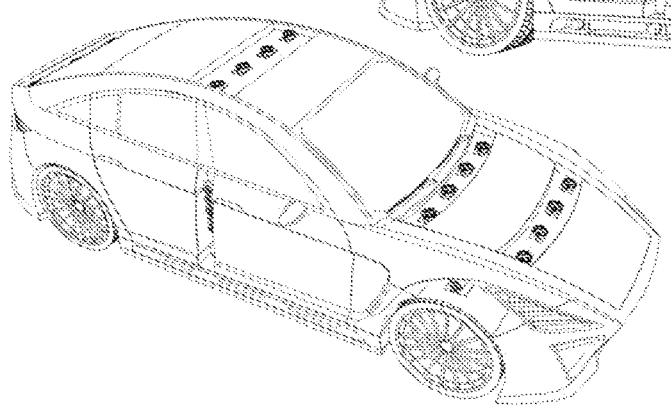
FIG. 29: It is a top perspective view from the front of the vehicle with the drive devices (C1) identified.
Figure 30:
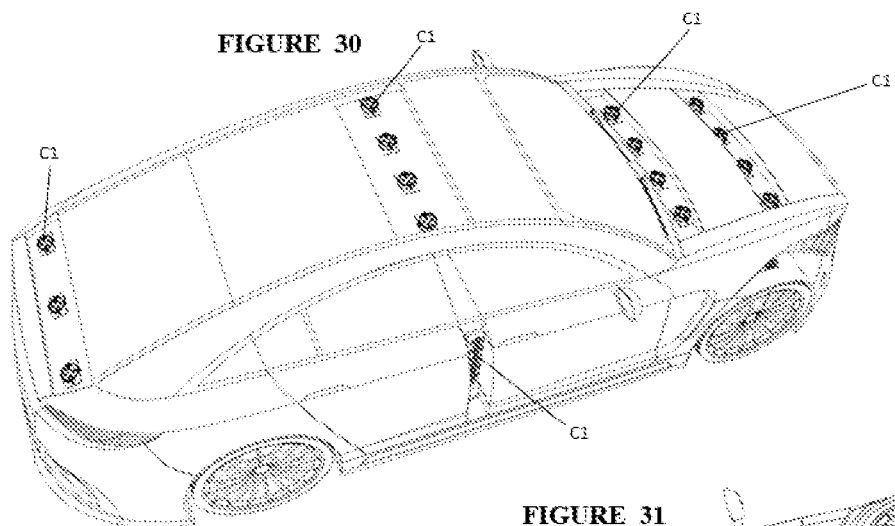
FIG. 30: It is a top perspective view from the back of the vehicle with the drive devices C1 identified.
Figure 31:
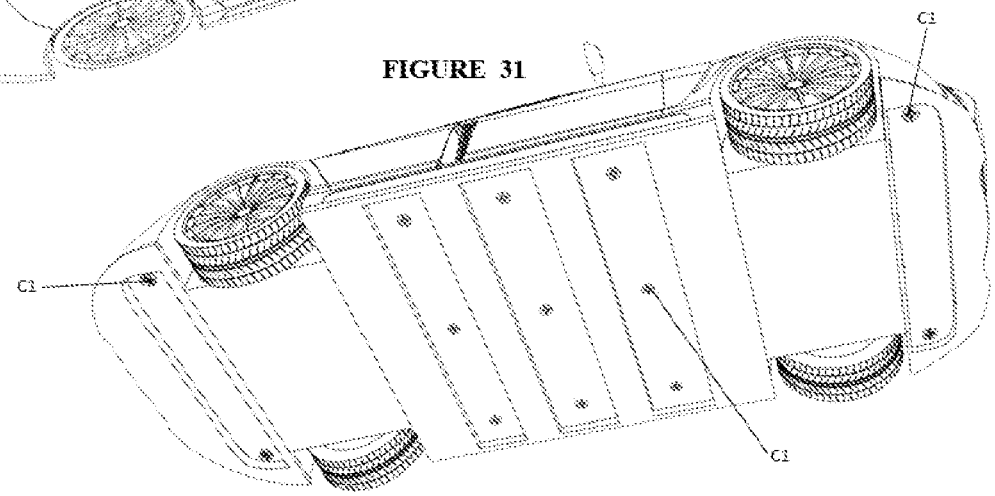
FIG. 31: It is a perspective view of the lower part of the vehicle with the drive devices C1 identified
Figure 32:
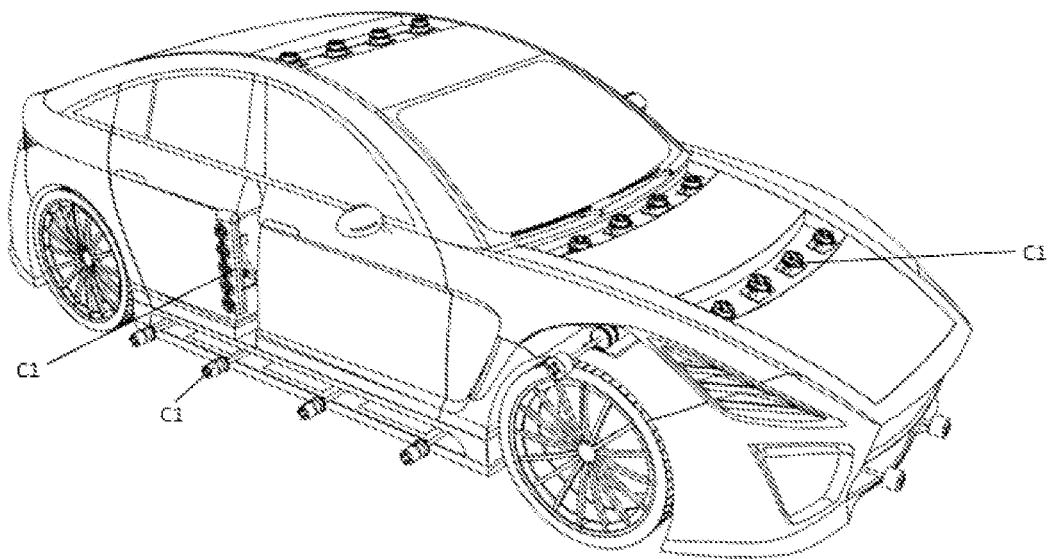
FIG. 32: It is a top perspective view of the right and front side of the vehicle with the airbag actuator devices (C1) activated.
Figure 33:
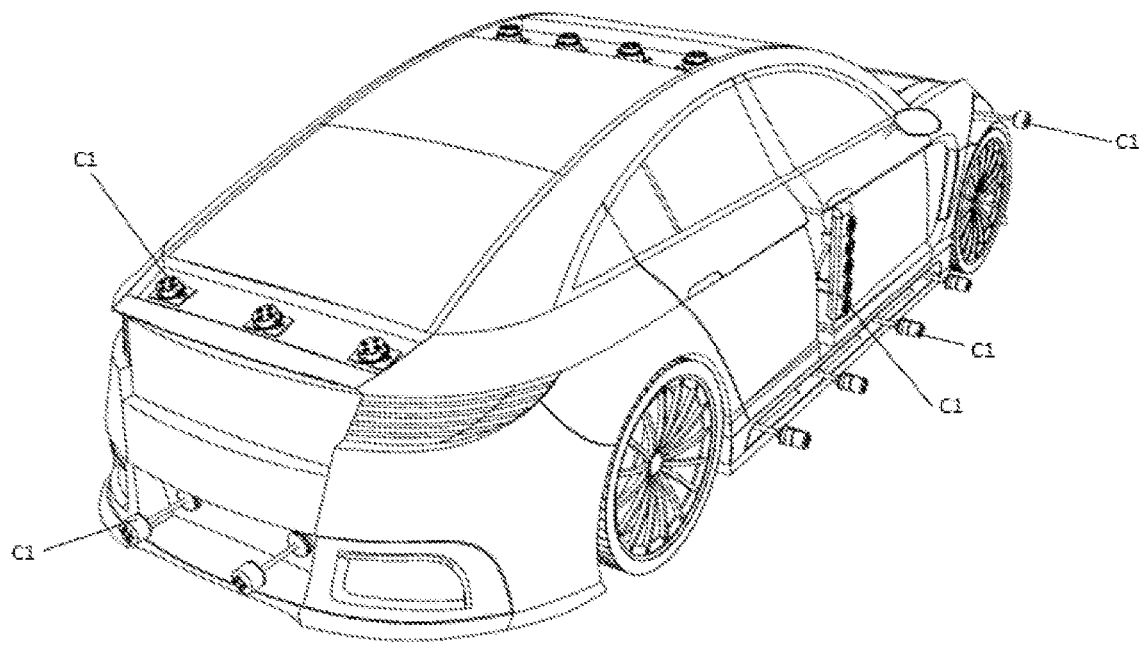
FIG. 33: It is a perspective view of the back and the right side of the vehicle with the device of air bags (C1) activated.
Figure 34:
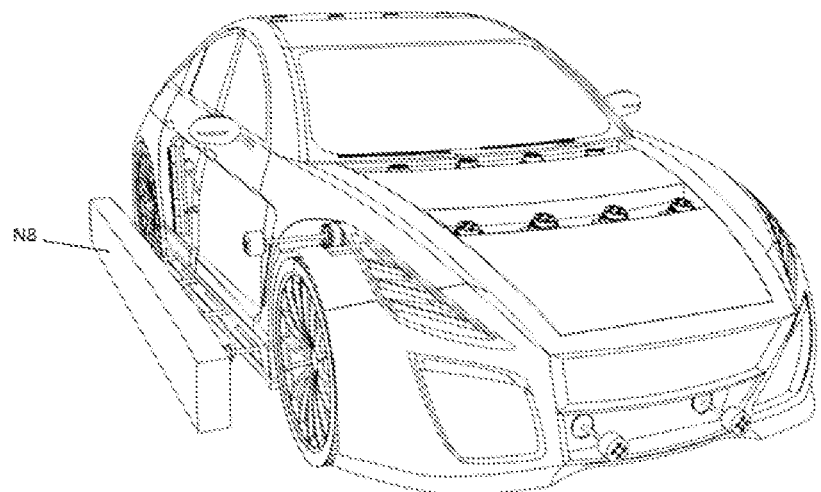
FIG. 34: It is a front perspective view of the right side of the vehicle with the air bags (N8) inflated that are in the spoiler.
Figure 35:
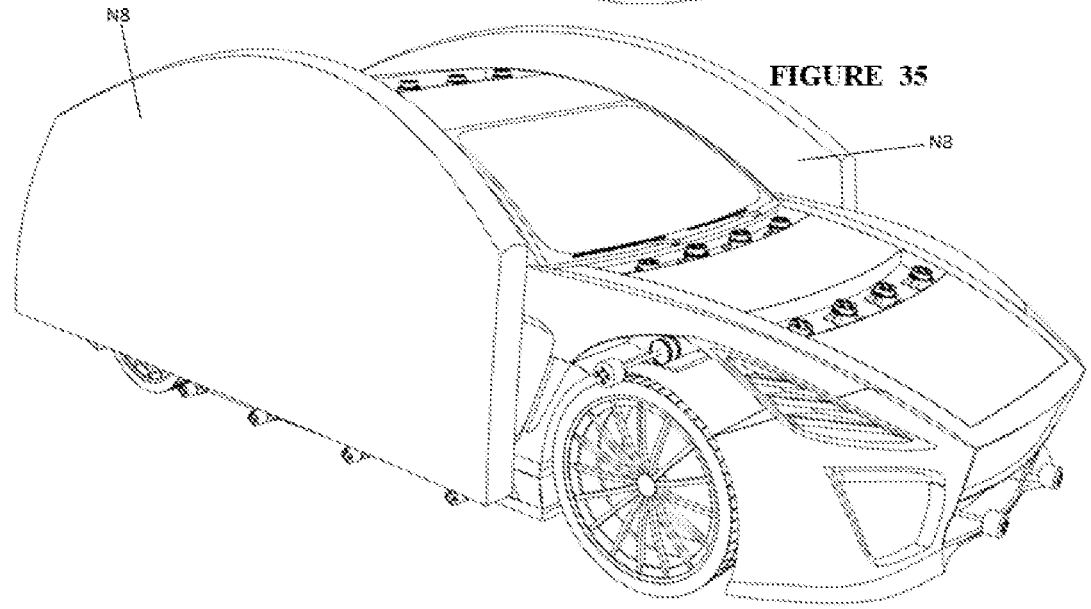
FIG. 35: It is a front and right side perspective view with the airbags (N8) inflated that protect the doors.
Figure 36:
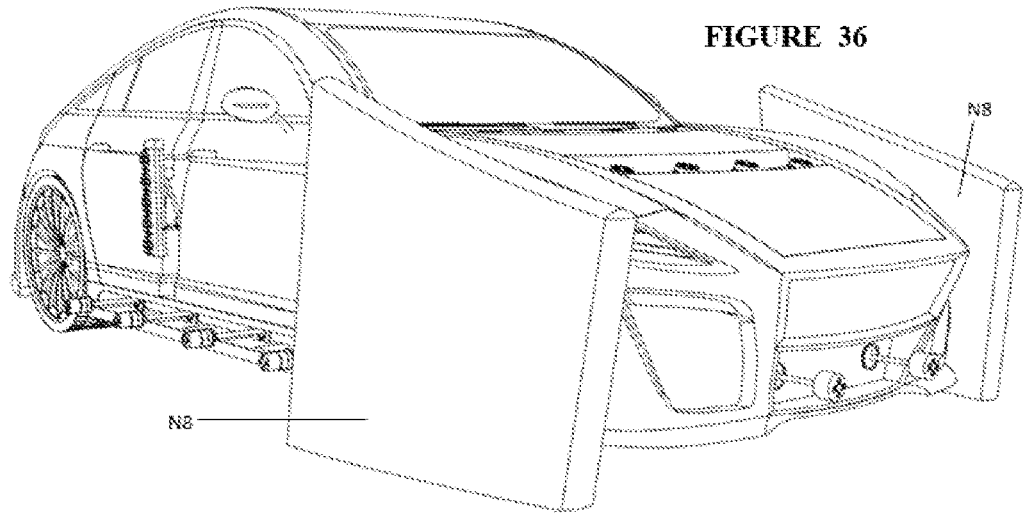
FIG. 36: It is perspective view on the right side with the airbags (N8) inflated that are in the fenders
Figure 37:
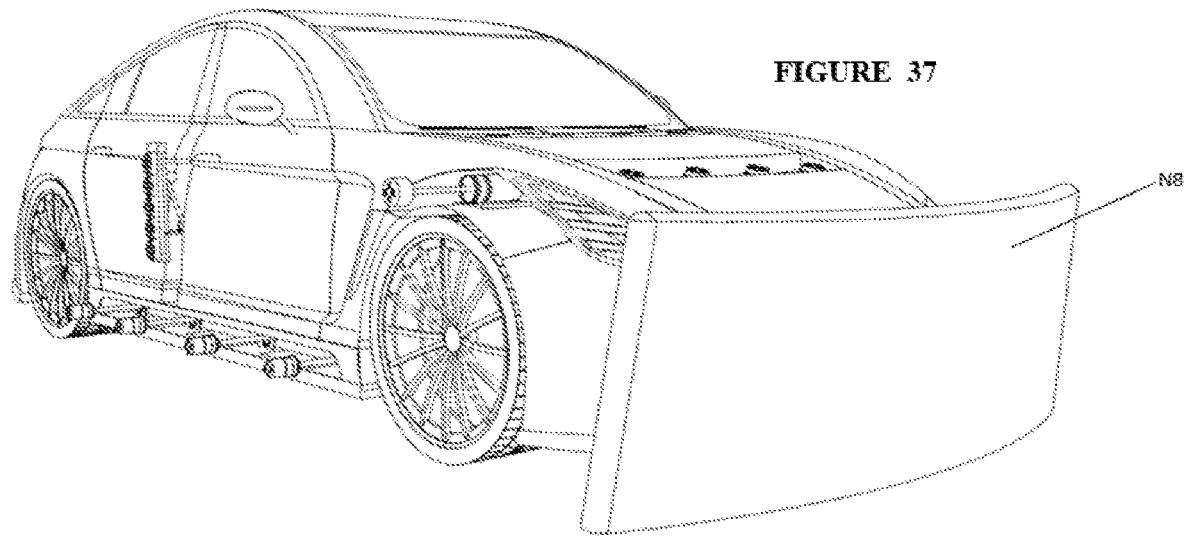
FIG. 37: It is perspective view on the right side with the airbags (N8) inflated from the front part of the vehicle.
Figure 38:
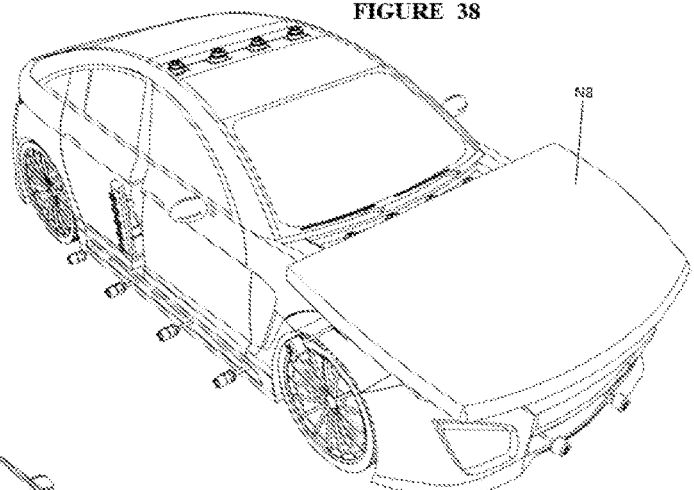
FIG. 38: It is a top perspective view with the airbags (N8) inflated that are in the bonnet of the vehicle.
Figure 39:
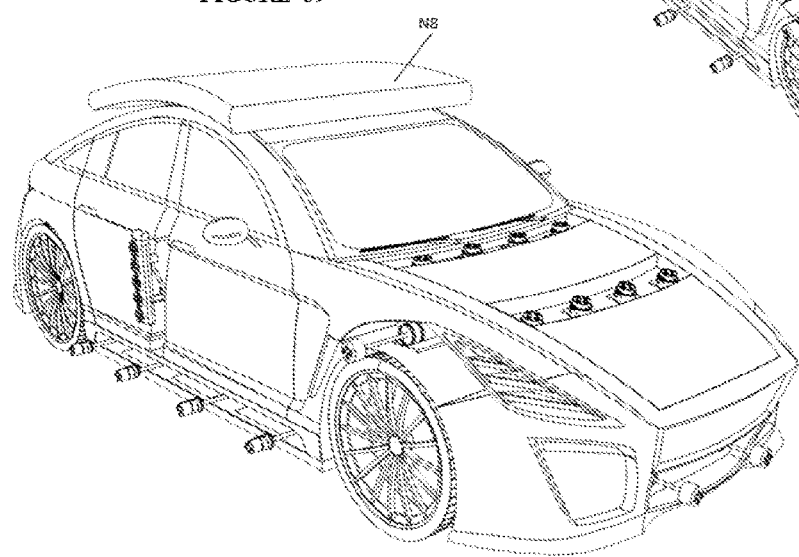
FIG. 39: It is a top perspective view with the airbags (N8) inflated on the roof of the vehicle.
Figure 40:
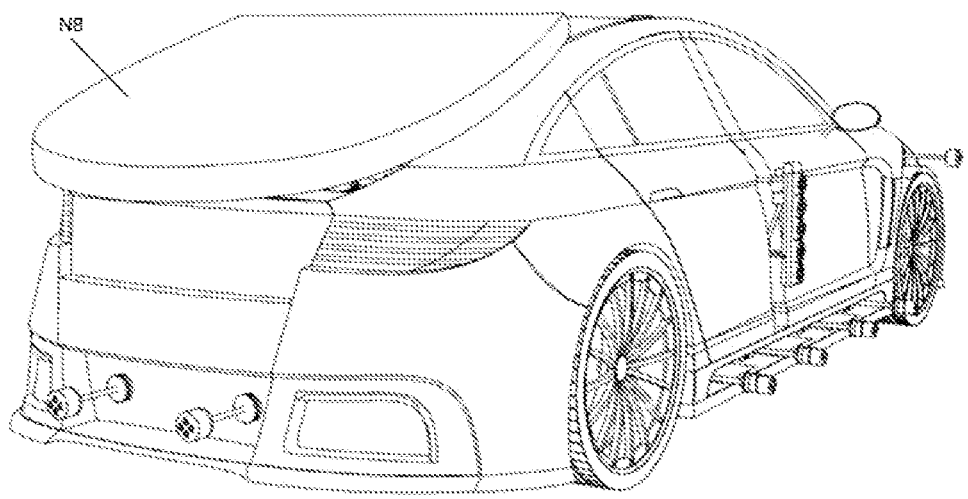
FIG. 40: It is a rear perspective view and on the right side with the inflated air bags (N8) that are in the trunk of the vehicle.
Figure 41:
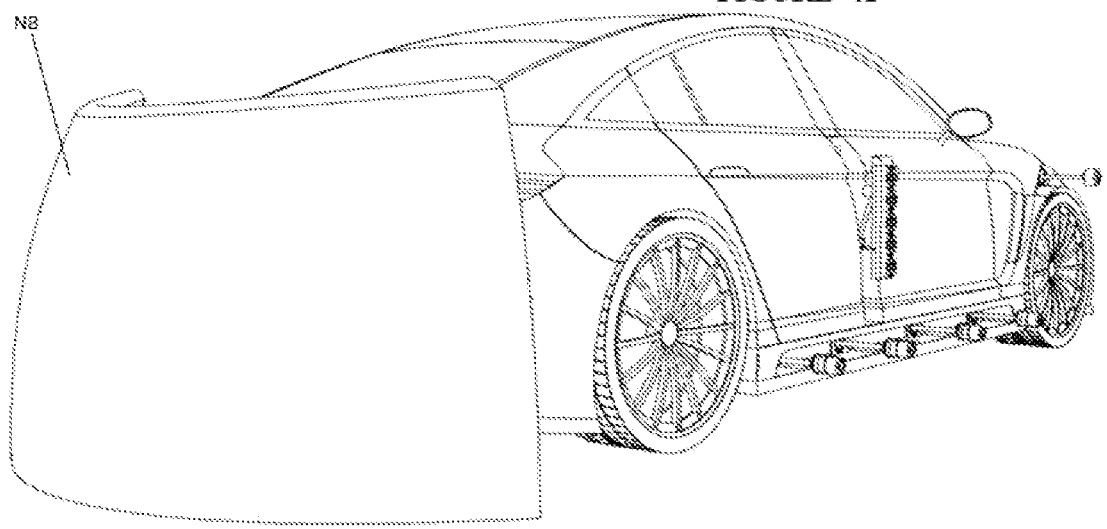
FIG. 41: It is a rear perspective It is a rear perspective view with the bumper airbags (N8) inflated.
Figure 42:
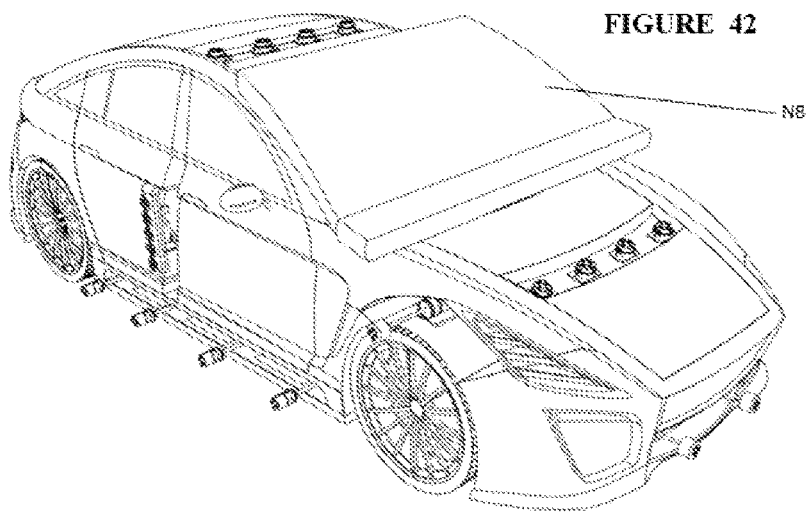
FIG. 42: It is a top perspective view with the hood airbags (N8) inflated and protecting the front glass.
Figure 43:
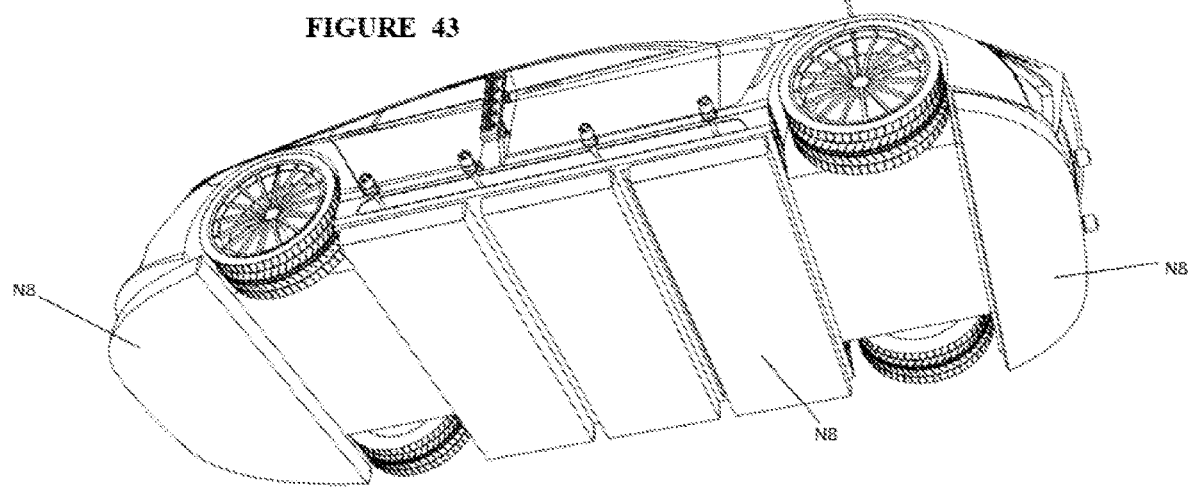
FIG. 43: It is a bottom perspective view with the airbags (N8) inflated protecting the lower part of the vehicle.
Figure 44:
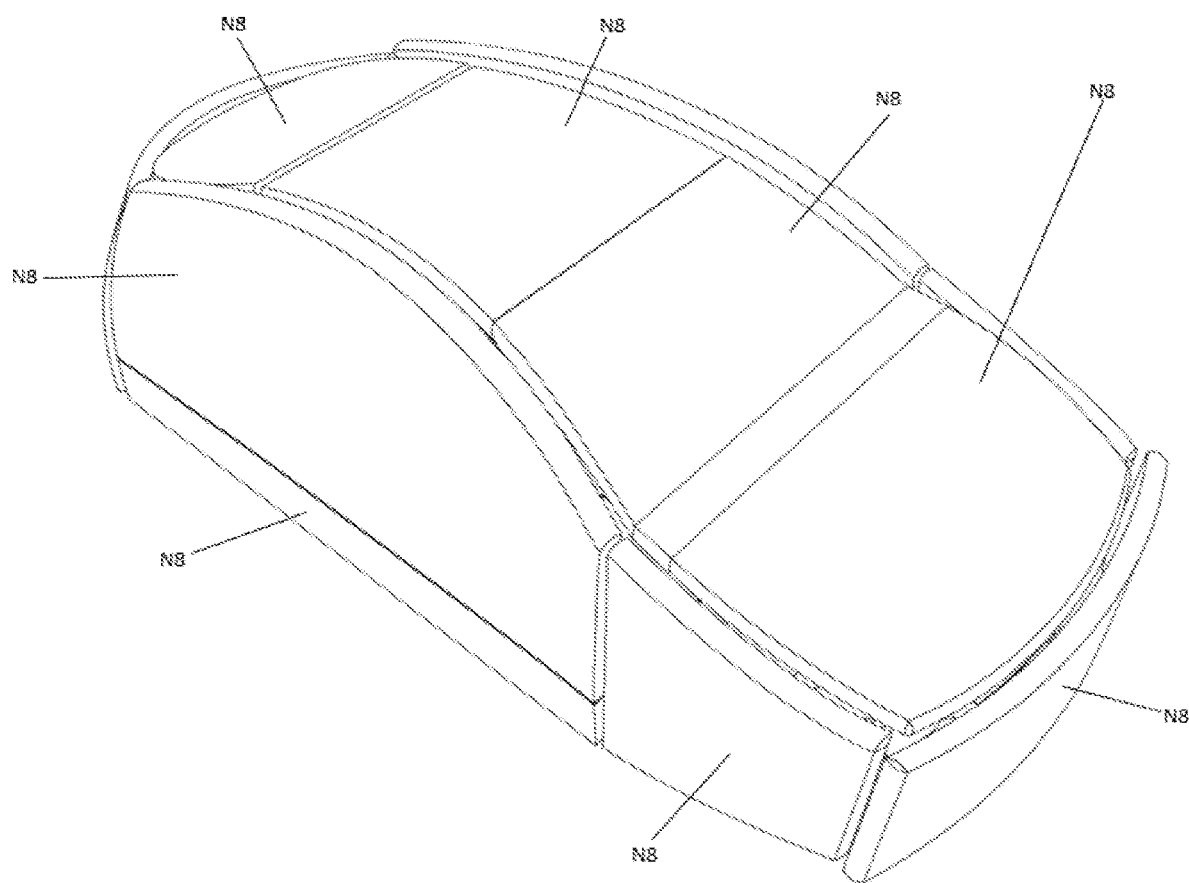
FIG. 44: It is a top perspective view with all the airbags (N8) inflated in the vehicle.

Preferential Execution of the Main Mounting Structure (MS1).

The main mounting structure (MS1) is constructed of a strong material, preferably aluminum, which helps protect and reinforce the vehicle. Said main mounting structure (MS1) could be a chassis or the bodywork of any vehicle.

The main mounting structure or chassis (MS1) consists of a base for the mounting structure (J1) having a plurality of recesses in the lower part, in said recesses are placed a plurality of protective bases (E1) in which said protective bases (E1) have a compartment from which are fastened with screws (C1.4) the airbag actuating devices (C1) and are also fastened with a connecting piece (N3) the airbags (N8) of the airbag actuating devices (C1) and on the entire upper edge of said compartment protrudes a flange with holes and on said flanges is placed a rubber gasket (EG) which is responsible for protecting the entire area surrounding the protective base (E1) preventing the entry of any substance or element into the interior of the mounting structure (J1). Through the holes of the flange protruding from the protective base (E1) are placed some screws that will be fixed to the lower part of the mounting structure (J1) so that said protective bases (E1) are completely fixed to the mounting structure (J1). The protective base compartment (E1) is configured such that a protective cover (E1a) can be press-fitted thereto, wherein said cover (E1a) is responsible for protecting the entire inner part of the compartment housing the air bag actuation devices (C1) and the air bags (N8). When the air bags (N8) located in the compartments of the protective base (E1) are inflated, the latter protects the entire underside of the vehicle.

Four rubber protectors (J5a) are welded to the upper part of the mounting structure (J1), such that the first of said protectors (J5a) is fixed to the left side of the front part, the second of said protectors (J5a) is fixed to the right side of the front part, the third of said protectors is fixed to the left side of the rear part and the fourth of said protectors (J5a) is fixed to the right side of the rear part of said mounting structure (J1), the first and the second of said protectors (J5a) are welded to a protection base (E1) where said protection bases (E1) have a compartment from where they are fixed with screws (C1.4) the airbag actuating devices (C1) and also the airbags (N8) of said airbag actuating devices (C1) are fixed with a connecting piece (N3). The protective base (E1) of said first rubber protector (J5a) and of said second rubber protector (J5a) are configured such that a protective cover (E1a) can be fitted thereon for each of said protective base (E1), wherein said covers (E1a) are responsible for protecting the entire inner part of said compartment wherein said airbag actuating devices (C1) and airbags (N8) are housed. When the airbags (N8) of said compartments having the protection base (E1) which are in said first and second rubber protectors (J5a) are inflated, they protect the entire area surrounding the right front fender and the left front fender. Said rubber protectors (J5a) are responsible for reinforcing the mounting structure (J1) and protecting the rubber.

On the left side and on the right side of the upper part of the mounting structure (J1) two reinforcements (J2a) are welded one on each side and at each end of said reinforcements (J2a) two reinforcements (J10a) are welded transversely, forming a frame and in the center of said mounting structure (J1) a plurality of reinforcements (J9a) are welded transversely, said reinforcements (J9a) are in charge of reinforcing the whole area of the center of the main mounting structure (MS1). Each of the reinforcements (J2a) has a protection base (E1) with a compartment where are placed with screws (C1.4) a plurality of air bag actuating devices (C1) and an air bag (N8) fastened with a connecting piece (N3) of said air bag actuating devices (C1). The reinforcement compartments (J2a) are configured so that a protective cover (E1a) can be snap-fitted, said cover (E1a) being responsible for protecting the entire inner part of the compartment where the air bag actuating devices (C1) and the air bags (N8) are housed. When the air bags (N8) of the compartments having the reinforcements (J2a) are inflated, they protect the left and right side of the vehicle.

Also on the upper part of the mounting structure (J1) just in the area between the middle of the front doors and the rear doors of the left and right side of the vehicle is welded a protective base (E1) wherein said protective bases (E1) have a compartment from which air bag actuating devices (C1.4) are fastened with screws (C1.4) and also the air bags (N8) of said air bag actuating devices (C1) are fastened with a connecting piece (N3). The compartments of said protective bases (E1) which are located between the center of the front doors and the rear doors of the left side and the right side of the vehicle are configured such that a protective cover (E1a) can be press-fitted, wherein said cover (E1a) is responsible for protecting the entire inner part of said compartment wherein the air bag actuating devices (C1) and the air bags (N8) are housed. When the air bags (N8) of said compartments having the protection bases (E1) are inflated, they protect the left and right side of the vehicle.

The front bumper and the rear bumper of the vehicle, each having a protective base (E1) comprising a compartment, within which a plurality of air bag actuating devices (C1) and an air bag (N8) are fixed with screws (C1.4), said air bag (N8) being fixed with a connecting piece (N3) of said plurality of air bag actuating devices (N8). The protective base (E1) of the front bumper and of the rear bumper is configured such that a protective cover (E1a) can be press-fitted thereon, said cover (E1a) being responsible for protecting the entire inner part of the compartment housing the airbag actuating devices (C1) and the airbags (N8). When the airbag (N8) of the base protection compartment (E1) of the front bumper is inflated, it protects the front of the vehicle and when the airbags (N8) of the base protection compartment (E1) of the rear bumper are inflated, it protects the rear of the vehicle.

The hood of the vehicle has a plurality of protective bases (E1) comprising a compartment, inside said compartment are fixed with screws (C1.4) a plurality of air bag actuating devices (C1) and a plurality of air bags (N8), said air bags (N8) being fixed with a connecting piece (N3) of said plurality of air bag actuating devices (N8). The plurality of protection bases (E1) of said hood are configured such that a protective cover (E1a) can be press-fitted thereto for each protection base (E1), wherein said covers (E1a) are responsible for protecting the entire inner part of the compartment where the air bag actuating devices (C1) and the air bags (N8) are housed. When the air bags (N8) of the hood protective base compartments (E1) inflate, they protect the area where the hood and the front window are located.

The vehicle roof has a protective base (E1) comprising a compartment, inside said compartment are fixed with screws (C1.4) a plurality of air bag actuating devices (C1) and a plurality of air bags (N8), said air bags (N8) being fixed with a connecting piece (N3) of said plurality of air bag actuating devices (N8). The protective base (E1) of said vehicle roof is configured such that a protective cover (E1a) can be press-fitted thereto, wherein said covers (E1a) are responsible for protecting the entire inner part of said compartment wherein said air bag actuating devices (C1) and air bags (N8) are housed. When the air bags (N8) of said compartment having the protective base (E1) which is on the roof are inflated, they protect the entire roof area.

The vehicle trunk has a protective base (E1) comprising a compartment, inside said compartment are fixed with screws (C1.4) a plurality of air bag actuating devices (C1) and a plurality of air bags (N8), said air bags (N8) being fixed with a connecting piece (N3) of said plurality of air bag actuating devices (N8). The protective base (E1) of said vehicle trunk is configured such that a protective cover (E1a) can be press-fitted thereon, wherein said cover (E1a) is responsible for protecting the entire inner part of said compartment in which said air bag actuating devices (C1) and air bags (N8) are housed. When the air bags (N8) of said compartment having the protective base (E1) which is in the luggage compartment are inflated, they protect the whole area of the luggage compartment.

PREFERENTIAL EXECUTION OF THE MAIN COMPUTER OF THE Main System Computer SYSTEM (I1).

The main computer of the system (I1) consists of a plurality of modules (C1.22) where each module has a CPU (C1.20), a memory (C1.24) which is responsible for storing all the processes of the CPU (C1.20), a switch (C1.21) which is responsible for receiving the signal from the CPU (C1.20) to then activate the corresponding airbag actuating device (C1), and a plurality of contact points (C1.23), said contact points (C1.23) are high conductivity plates from which are connected the cables that send the activation signal and power supply to the airbag actuating devices (C1), the radars (F1), the fluid sensors (WS), the inclinometer (H1), also are connected the cables that send the information and power supply to the monitor (K1) or the cables that are connected to the power supply (G1), said power supply is responsible for supplying power to all components connected to the main computer of the system (I1).

Preferential Performance of Radars (F1).

Is an automotive radar system having a high frequency radio transmitter that generates a radar signal in a known direction. A high frequency radio receiver receives echoes of the radar signal in which each echo represents a reflection of the radar signal of an object.

The radars are in charge of receiving and processing the information to then send the data obtained to the main system computer (I1), which will be responsible for processing and issuing the final order that consists of activating or keeping the airbag devices on alert (C1). The radars when they detect the presence of animated objects and these are within the area of possible impact the system cannot be activated because it compromises the safety of said animated objects.

Preferential Realization of Fluid Level Sensors (WS).

A plurality of fluid sensors (WS) having several specially coated and water repellent probe elements which are housed in a receptacle which in turn is embedded in a plastic molded body or the like to absolutely seal the sensing unit against corrosion, said fluid sensors consisting of two levels, at the lower level the option of sending the activation signal to the air bag actuation devices (C1) is disabled, when water reaches the upper level of said fluid sensors (WS) they send a signal to the main system computer (I1) and said main computer (I1) sends an activation command to a plurality of switches (C1.21) which will activate the air bag reinforcement devices (C1) located at the bottom of the vehicle and if all fluid sensors (WS) are activated, said fluid sensors (WS) will send an activation command to all switches (C1.21) to activate all air bag devices (C1).

Preferential Performance of the Inclinometer (H1).

The inclinometer (H1) is located inside a sealed housing having a tubular member with several high conductivity contact plates, and at opposite ends of said tubular member has several high conductivity contact plates. When the tilt angle of the vehicle exceeds the tilt limit set by the inclinometer (H1), i.e., the vehicle is about to roll over, the contact plates of the tubular member will strike one of the end contact plates. This causes the inclinometer (H1) to send a signal to the main system computer (I1) which will activate all air bag boosters (C1).

Preferential Performance of the Detonating Chargers (DC).

In the present invention we use detonating chargers (DC) comprising, a protective cover (DC2) that serves to protect the container of compressed gas (DC6). On the front of the protective cover (DC2) a pressure seal (DC1) will be placed, said seal in its center is rubber, with a hole in the middle. The pressure seal (DC1) comprises grooves that form a circle, and that extends over the entire edge of the pressure seal (DC1), in the slot is placed under pressure and preferably with high strength glue, the tabs that you protrude into the front of the compressed gas container (DC6).

Then it is soldered through the edge of the slot until it is completely fixed and sealed. Then enter the front of the pressure seal (DC1), the back of the protective cover (DC2), so that the hole (DC12) is aligned with the whole (DC11). When the back of the protective cover (DC2) reaches the other end, the tab that is on the front of the protective cover (DC2), is above the edge of the pressure seal (DC1) to which it was applied in advance, preferably high strength glue for When the tabs of the protective cover (DC2) are properly fitted, fit and glued, then weld with solder all along the edge of the front of the tabs of the protective cover (DC2).

In this way the edges of the front part of the gas container (DC6) and the protective cover (DC2) are completely sealed. On the back of the compressed gas container (DC6) is configured to place a seal preferably in aluminum that is welded all over the outside edge, and in the center of said seal has a rubber pressure (DC7) with a hole in the middle.

A plunger (DC8), which has a rubber stopper (DC9) at the front end, and a small stick attached to the material behind the rubber stopper, will enter through the hole; that protrudes on each side, forming a cross and at the rear end of the plunger (DC8) has a larger rubber stopper (DC13).

The plunger (DC8) is placed inside the compressed gas container (DC6) as follows: The rubber plug (DC9) enters through the hole in the back of the compressed gas container (DC6) until it reaches the other end, where it is placed under pressure in the hole of the front pressure seal (DC1) and simultaneously the rubber stopper (DC13) is placed in the hole in the back of the compressed air container (DC6), so that the rubber stopper (DC13) is completely adjusted from the pressure rubber (DC7). When placing the plunger in the corresponding manner; the compressed gas container is completely sealed.

The back cover (DC3) on the back of the protective cover (DC2) is then pressed so that the tabs protruding from the front of the back cover (DC3) are above the back of the protective cover (DC2), then it is soldered by the entire edge of the flange of the back cover (DC3) until it is completely fixed and sealed.

In the back of the back cover (DC3) the tablets of sodium acid are introduced, then the top cap (DC4) is placed under pressure and preferably with high strength glue inside the tabs that protrude towards the inside from the back of the back cover (DC3). When the bottom cap is properly positioned, it is welded all the way around the edge until it is completely fixed and sealed. The bottom plug (DC4) on the back has two cylinder-shaped bases that protrude, one below the other. In the center of the bases it has a groove in the shape of a rectangle, where the detonators (DC5) are preferably placed with high resistance glue and under pressure. In this way it is completely fixed and sealed. When the detonators (DC5) are correctly positioned; the front of the detonator (DC5) is in direct contact with the sodium acid tablets (DC10); and on the back of the detonators (DC5) the positive and negative cables protrude outwards.

The chemical compounds that are mixed with the tablets of sodium acid are: potassium nitrate and silicon oxide. As is known, potassium nitrate reacts with sodium to end up forming a mixture of alkaline oxides. Finally, these are combined with silicon dioxide to form a mixture of sodium and potassium alkali silicates, a stable and inert product.

The chemical components mentioned do not limit the possibility of using other components to improve the results.

The proposed detonating chargers (DC) do not limit the possibility of using other detonating chargers.

Preferential Performance of the Air Bags (N8).

The air pockets (N8) may comprise at least one air inlet, but because several air bag impellers have been placed in parallel; the air bags (N8) of the present invention comprise several air inlets because said airbags (N8) are larger and require a large amount of gas to be filled.

The air bags (N8) of the present invention preferably use high strength nylon as the main material.

All nylon parts that make up the airbags (N8) are gripped on the edges preferably with high strength glue and with a nylon seam to complete the desired shape and the nylon base (N1) that is placed with glue high strength and with several seams throughout the area of the air intakes that are at the bottom of said air bags (N8). Said air bags (N8) are provided with a plurality of valves which are in charge of controlling the gas filling the air bags (N8).

It should be noted that the design of the air bags can vary, but maintaining its essence, that is to say that it can have more air intake or less, it can be placed more gas exhaust valve or less, the position of the gas exhaust valve can change, the size of the airbags can be larger or smaller, the shape of the airbag can change.

When the air bags receive an impact, just at that moment, the pressure that is exerted inside the airbag, activates the gas exhaust valves, releasing the gas progressively by the sides, in this way the energy of the impact it dissipates towards the sides and thus we diminish the magnitude of the damage that the impact can cause.

Preferential Execution of the Connecting Piece (N3).

The connecting piece (N3) is characterized in that it comprises a piece with flanges protruding from the lower part forming the grip area (N4). Said connecting piece is preferably placed with high strength glue on the protective cap (C1.7) and then welded by the entire outside edge of said joint and the gripping areas (N4). Then the border (N2) is placed on the joining piece (N3) under pressure and with high strength glue. The border (N2) comprises of a nylon base (N1) that protrudes from the top where it is sewn over the area of the gas inlet of the air bag (N8). When the edging (N2) is correctly placed on the connecting piece (N3), the edging (N2) is clamped (N5) so that the clamp (N5) is placed just below the protruding edges located on the upper part of the connecting piece (N3). The clamp (N5) is fastened with screws (N6) until it is completely fixed. In this way the airbag (N8) of the airbag ejector devices (C1) are held.

Monitor (K1).

It is responsible for viewing in the state in which the system is located, it has a minimum of three connections; one connection is connected to the negative cable of the energy supply (G1) the second connection is connected to the positive cable of the energy supply (G1) and the third connection is connected to the main system computer (I1). The cable that connects to the CPU (I1) is the one that supplies the monitor with the information on which the system of the present invention is located.

Operation in Accordance with a Preferred Embodiment of the System and the Air Bag Driver "Piston Type" (C) is as Follows:

The radars (F1) receive the information, it is in turn passed to the CPU (C1.20), said CPU (C1.20) is responsible for processing it to then issue an order and activate the airbag devices "Piston Type" (C1) or keep the system on alert. In case the radars (F1) detect a possible impact, the CPU (C1.20) processes the information and then sends the activation signal to the switch (C1.21) who will send the signal to the thrust detonating chargers (DC) that are connected in parallel, thus activated simultaneously. When the detonating chargers (DC) are activated by means of the switch (C1.21) they release a gas that pushes down the piston (C1.11) which has two mechanism of action (C1.17), when making contact with the mechanisms of action (C1.9) that has active current, sends an activation signal to the detonating chargers of the airbag (DC) which are connected to the connecting piece (C1.7), filling the airbags as much as possible to protect the area that corresponds.

Preferential Embodiment of the Air Bag Driver "Piston Type" (C).

Piston type air bag propelling device (C1) consists of a main base (C1.1) in the form of a cylinder, said cylinder is hollow inside and in the lower part of said main base (C1) consists of tabs that protrude along the entire edge of said main base (C1.1) and in said tabs has a plurality of holes where a plurality of screws (C1.4) will be inserted to fasten said main base (C1.1) to the protective bases (E1).

In the lower part of the main base (C1.1) has a limiting collar (C1.8) consisting of two holes which are located one at each end of said limiting collar (C1.8) and in each of said holes are placed an action mechanism (C1.9) which has a plate preferably of copper, where said plate is connected with one of the modules (C1.22) through a plurality of wires.

The air bag driving device (C1) also comprises a main protective cover (C1.10) having two holes in the upper part of said protective cover (C1.10) and two holes in the lower part of said protective cover (C1.10) where in said holes in said upper part two pusher detonating magazines (DC) are pressed and welded in such a way that the gas outlet of said pusher detonating magazines (DC) protrude through the holes in the lower part of said protective cover (C1.10). Said protective cap (C1.10) is press-fitted and welded to the upper edge of the main base (C1.1).

The air bag driving device (C1) also consists of a piston (C1.11x) which has abase protruding from the top where an impact rubber (C1.13) is press-fitted, said impact rubber (C1.13) serving to cushion the impact of the piston (C1.11x) when it recoils and collides with the main protective cover (C1.10) and said piston (C1.11x) has a groove all around the edge and in said groove an anti-friction ring (C1.12) is placed to prevent the inner part of the main base (C1.1) and the piston (C1.11x) friction, and in said lower part of the piston (C1.11x) there is a hole where one of the ends of a piston rod (C1.14) is placed and the other end of said piston rod (C1.14) is placed in the hole that has in the upper part of the piston (C1.11y), said piston (C1.11y) has a groove on the entire edge and on said edge an anti-friction ring (C1.12) is placed, and on the lower part of said piston (C1.11y) has a recess where a protective cover (C1.16) is placed with welding, where said protective cover (C1.16) has a plurality of holes in the center of said cover and on the sides of said cover has two holes, one at each end, in the holes in the center of said protective cover (C1.16) are placed with welding a plurality of detonating magazines (DC) and in the upper part of the protective cover (C1.16) protrude the bottom caps (DC4) of said detonating magazines (DC) where the detonators (DC5) are located and the wires (C1.19) which are connected to said detonators (DC5) are protected with a plurality of caps (C1.15) to avoid contact of the wires (C1.19) with other parts surrounding said wires (C1.19) and on the front part of said detonating chargers (DC) where the gas outlet is placed a connecting piece (C1.7) which is responsible for holding together said detonating magazines (DC), and in each hole that are at the ends of said protective cap (C1.16) are placed under pressure an action mechanism (C1.17) which has a base with a plate preferably of copper, said action mechanism (C1.17) are connected with said detonating magazines (DC).

By placing inside the main base (C1.1) the pistons (C1.11x) and C1.11y) in conjunction with the protective cap (C1.16) having said action mechanisms (C1.17), the detonating magazines (DC) and the connecting piece (C1.7), said action mechanisms (C1.17) are aligned with the action mechanisms (C1.9) of the limiting collar (C1.8). When the main computer of the system sends the activation signal to the pusher detonating chargers (DC), said pusher chargers (DC) release the gas that will push the pistons (C1.11x) and (C1.11y) forward and the action mechanisms (C1.17) that are attached to the protective cap (C1.16) where said cap is attached to the piston (C1.11y), when said piston (C1.11y) reaches the other end of the main base, (C1.1) said action mechanism (C1.17) makes contact with the action mechanism of the limiting collar (C1.8), the action mechanism (C1.17) sends an activation signal to the detonating chargers (DC) that are attached to the connecting piece (C1.7) causing the release of the gas that inflates the air bags (N8).

The proposed air bag devices (C) do not limit the possibility of using other air bag impellers.

The invention described in this way, it will be obvious that it can be developed in different ways. Such variations should not be considered as a deviation from the spirit and scope of the invention, and all are intended to be included within the scope of the following non-limiting claims.

The invention claimed is:

1. A vehicle comprising
   a vehicle body;
   a plurality of air bags;
   a plurality of sets of impellers;
   wherein each of the plurality of air bags is characterized by
      a non-activated condition in which
         each of the plurality of air bags is not activated;
      a pushed condition in which
         each of the plurality of air bags is pushed by a respective set of the plurality of sets of impellers so that each of the plurality of air bags is at a respective location external to the vehicle body; and
      an inflated condition in which
         each of the plurality of air bags is inflated; and
         each of the plurality of air bags does not contact the vehicle body.

2. The vehicle of claim 1 further comprising
   a mounting structure reinforcing the vehicle body;
   a sensing system;
   a computer system comprising a central processing unit (CPU) processing data from the sensing system; and
   a power supply supplying power to the plurality of sets of impellers, the sensing system, and the computer system.

3. The vehicle of claim 2, wherein the sensing system contains a plurality of high frequency radars detecting a plurality of objects approaching the vehicle.

4. The vehicle of claim 2, wherein the sensing system contains an inclinometer detecting a tilt angle of the vehicle.

5. The vehicle of claim 2, wherein the sensing system contains a plurality of fluid level sensors detecting fluid levels.

6. The vehicle of claim 1, wherein the plurality of sets of impellers comprises a first set of impellers connected in parallel.

7. The vehicle of claim 1, wherein the plurality of sets of impellers are folding arm type of impellers;
   wherein the plurality of sets of impellers comprises
      a first set of the impellers; and
   wherein each of the first set of the impellers comprises
      a detonating charger configured to inflate a selected air bag of the plurality of air bags;
      a front main base;
      a rear main base;
      a grip ring;
      a grip base; and
      a foldable arm comprising
         a first end connected to the grip base; and
         a second end connected to the rear main base.

8. The vehicle of claim 1, wherein the plurality of sets of impellers are piston type of impellers;
   wherein the plurality of sets of impellers comprises
      a first set of the impellers; and
   wherein each of the first set of the impellers comprises
      a detonating charger configured to inflate a selected air bag of the plurality of air bags;
      a piston comprising
         an upper part;
         a middle part comprising a groove; and
         a lower part;
      a detonating thrust loader configured to push the piston; and an antifriction ring engaged in the groove of the middle part of the piston.

9. The vehicle of claim 1, wherein the plurality of sets of impellers are piston type of impellers;
wherein the plurality of sets of impellers comprises
a first set of the impellers; and
wherein each of the first set of the impellers comprises
a main base;
an L-shape support bracket holding the main base;
a piston comprising
an upper part comprising a hole configured to receive a stem;
a middle part comprising a rail; and
a lower part;
a piston rod connected to the piston;
an antifriction ring engaged in the rail of the middle part of the piston;
a pipe; and
a gas exhaust valve.

10. The vehicle of claim 1 further comprising
a mounting structure reinforcing the vehicle body;
wherein the mounting structure comprises
four tire protectors;
a plurality of protected bases; and
a central part comprising
four reinforcement members;
wherein each of the four reinforcement members is positioned at a respective corner of the central part of the mounting structure.

11. The vehicle of claim 1, wherein the plurality of air bags comprises
a first air bag;
wherein each of the plurality of air bags is characterized by the inflated condition in which
the first air bag is under the vehicle body.

12. The vehicle of claim 11, wherein the plurality of air bags comprises
a second air bag; and
a third air bag;
wherein each of the plurality of air bags is characterized by the inflated condition in which
the second air bag is under the vehicle body; and
the third air bag is under the vehicle body.

13. A vehicle comprising
a vehicle body;
a plurality of air bags;
a plurality of sets of impellers;
wherein each of the plurality of air bags is characterized by
a non-activated condition in which
each of the plurality of air bags is not activated;
a pushed condition in which
each of the plurality of air bags is pushed by a respective set of the plurality of sets of impellers so that each of the plurality of air bags is at a respective location external to the vehicle body; and
an inflated condition in which
each of the plurality of air bags is inflated;
wherein the plurality of sets of impellers are folding arm type of impellers;
wherein the plurality of sets of impellers comprises
a first set of the impellers; and
wherein each of the first set of the impellers comprises
a detonating charger configured to inflate a selected air bag of the plurality of air bags;
a front main base;
a rear main base;
a grip ring;
a grip base; and
a foldable arm comprising
a first end connected to the grip base; and
a second end connected to the rear main base.

14. The vehicle of claim 13 further comprising
a mounting structure reinforcing the vehicle body;
wherein the mounting structure comprises
four tire protectors;
a plurality of protected bases; and
a central part comprising
four reinforcement members;
wherein each of the four reinforcement members is positioned at a respective corner of the central part of the mounting structure.

15. The vehicle of claim 13, wherein the plurality of air bags comprises
a first air bag;
a second air bag; and
a third air bag;
wherein each of the plurality of air bags is characterized by the inflated condition in which
the first air bag is under the vehicle body;
the second air bag is under the vehicle body; and
the third air bag is under the vehicle body.

16. A vehicle comprising
a vehicle body;
a plurality of air bags;
a plurality of sets of impellers;
wherein each of the plurality of air bags is characterized by
a non-activated condition in which
each of the plurality of air bags is not activated;
a pushed condition in which
each of the plurality of air bags is pushed by a respective set of the plurality of sets of impellers so that each of the plurality of air bags is at a respective location external to the vehicle body; and
an inflated condition in which
each of the plurality of air bags is inflated;
wherein the plurality of sets of impellers are piston type of impellers;
wherein the plurality of sets of impellers comprises
a first set of the impellers; and
wherein each of the first set of the impellers comprises
a detonating charger configured to inflate a selected air bag of the plurality of air bags;
a piston comprising
an upper part;
a middle part comprising a groove; and
a lower part;
a detonating thrust loader configured to push the piston; and
an antifriction ring engaged in the groove of the middle part of the piston.

17. The vehicle of claim 16 further comprising
a mounting structure reinforcing the vehicle body;
wherein the mounting structure comprises
four tire protectors;
a plurality of protected bases; and
a central part comprising
four reinforcement members;
wherein each of the four reinforcement members is positioned at a respective corner of the central part of the mounting structure.

18. The vehicle of claim 16, wherein the plurality of air bags comprises
a first air bag;
a second air bag; and
a third air bag;

wherein each of the plurality of air bags is characterized by the inflated condition in which
    the first air bag is under the vehicle body;
    the second air bag is under the vehicle body; and
    the third air bag is under the vehicle body.

\* \* \* \* \*